United States Patent
Solon

(10) Patent No.: US 12,407,295 B2
(45) Date of Patent: Sep. 2, 2025

(54) LEAD ASSEMBLY FOR CONNECTING SOLAR PANEL ARRAYS TO INVERTER

(71) Applicant: SHOALS TECHNOLOGIES GROUP, LLC, Portland, TN (US)

(72) Inventor: Dean Solon, Gallatin, TN (US)

(73) Assignee: Shoals Technologies Group, LLC, Portland, TN (US)

( * ) Notice: Subject to any disclaimer, the term of this patent is extended or adjusted under 35 U.S.C. 154(b) by 0 days.

(21) Appl. No.: 19/086,937

(22) Filed: Mar. 21, 2025

(65) Prior Publication Data

US 2025/0219573 A1    Jul. 3, 2025

Related U.S. Application Data

(63) Continuation of application No. 18/739,127, filed on Jun. 10, 2024, which is a continuation of application
(Continued)

(51) Int. Cl.
| | |
|---|---|
| H02S 40/30 | (2014.01) |
| H01R 4/70 | (2006.01) |
| H01R 9/03 | (2006.01) |

(52) U.S. Cl.
CPC ............... H02S 40/30 (2014.12); H01R 4/70 (2013.01); H01R 9/03 (2013.01)

(58) Field of Classification Search
CPC ............. H01L 31/0422; H01L 31/0424; H01L 31/0482; H01L 31/0484; H01L 31/05;
(Continued)

(56) References Cited

U.S. PATENT DOCUMENTS

| | | |
|---|---|---|
| 1,831,002 A | 11/1931 | Hickey |
| 2,700,085 A | 1/1955 | Breisch et al. |

(Continued)

FOREIGN PATENT DOCUMENTS

| | | |
|---|---|---|
| CN | 2336459 | 9/1999 |
| CN | 2411542 | 12/2000 |

(Continued)

OTHER PUBLICATIONS

Balance of Systems Product Catalog 2012, Shoals Technologies Group, 36 pgs.
(Continued)

*Primary Examiner* — Ryan S Cannon

(57) ABSTRACT

A lead assembly includes first and second feeder cables and multiple drop lines. The feeder cables each has a first or second diameter and a first or second polarity. Each of the feeder cables contains two or more joints. Each joint electrically couples one or more drop lines to the first or second feeder cable at a nexus. Each drop line has a diameter that is less than the first diameter and less than the second diameter. Each drop line coupled to the first feeder cable is configured to be electrically connected to a wire harness configured to electrically connect to an array of solar panels. Two or more of the droplines that are connected to the first feeder cable each includes an in line fuse disposed between the joint and the wire harness. Each joint has a mold enclosure configured to enclose at least a portion of the nexus.

18 Claims, 26 Drawing Sheets

Related U.S. Application Data

No. 18/341,655, filed on Jun. 26, 2023, now Pat. No. 12,015,375, which is a continuation of application No. 17/301,609, filed on Apr. 8, 2021, now Pat. No. 11,689,153, which is a continuation of application No. 14/849,458, filed on Sep. 9, 2015, now Pat. No. 10,992,254.

(60) Provisional application No. 62/047,773, filed on Sep. 9, 2014.

(58) Field of Classification Search
CPC ......... H01L 31/02013; H01L 31/02008; H01L 31/02021; E04D 3/40; H02S 40/00–38; H02S 40/30; H02S 40/36; H01R 4/187; H01R 4/18; H01R 4/70; H01R 11/11; H01R 4/021; H01R 4/023; H01R 4/5205; H01R 13/5205; H01R 4/027; H01R 4/10; H01R 9/0509
USPC .................................. 52/173.3; 136/243–265
See application file for complete search history.

(56) References Cited

U.S. PATENT DOCUMENTS

| | | |
|---|---|---|
| 2,808,487 A | 10/1957 | Jacobs |
| 3,085,138 A | 4/1963 | Brown et al. |
| 3,086,242 A | 4/1963 | Cook et al. |
| 3,243,211 A | 3/1966 | Wetmore |
| 3,296,399 A | 1/1967 | Kozacka |
| 3,559,141 A | 1/1971 | Hardy |
| 3,678,432 A | 7/1972 | Boliver |
| 3,686,603 A | 8/1972 | Lockie et al. |
| 3,686,604 A | 8/1972 | Link et al. |
| 3,700,786 A | 10/1972 | Lawrenson |
| 3,781,745 A | 12/1973 | Vadnagara |
| 3,795,757 A | 3/1974 | Higgins |
| 3,818,407 A | 6/1974 | Edgerton |
| 3,852,516 A | 12/1974 | Vander et al. |
| 3,946,351 A | 3/1976 | Bronikowski et al. |
| 4,060,785 A | 11/1977 | Hanke et al. |
| 4,077,697 A | 3/1978 | Yates |
| 4,251,304 A | 2/1981 | Campbell et al. |
| 4,308,515 A | 12/1981 | Rooney et al. |
| 4,464,583 A | 8/1984 | Holmgren |
| 4,625,196 A | 11/1986 | Muench et al. |
| 4,778,948 A | 10/1988 | Fitch et al. |
| 4,780,598 A | 10/1988 | Fahey et al. |
| 4,947,149 A | 8/1990 | Pimpis et al. |
| 5,316,502 A | 5/1994 | Loet |
| 5,316,789 A | 5/1994 | Ookuma et al. |
| 5,726,851 A | 3/1998 | Knapp |
| 5,903,209 A | 5/1999 | Stepniak |
| 6,265,665 B1 * | 7/2001 | Zahnen .................. H01R 4/70 174/92 |
| 6,268,559 B1 * | 7/2001 | Yamawaki ............. H02S 40/34 307/77 |
| 7,387,537 B1 | 6/2008 | Daily |
| 7,422,458 B2 | 9/2008 | Arai |
| 7,445,488 B2 | 11/2008 | Feldmeier et al. |
| 8,207,637 B2 | 6/2012 | Marroquin et al. |
| 8,227,696 B2 | 7/2012 | Pullium, III et al. |
| 8,242,874 B2 | 8/2012 | Pavlovic et al. |
| 8,289,123 B2 | 10/2012 | Whitney et al. |
| 8,604,342 B2 | 12/2013 | Solon |
| 8,632,358 B2 | 1/2014 | Leonhard et al. |
| 8,657,624 B2 | 2/2014 | Yoshida |
| 8,699,209 B2 | 4/2014 | Barna |
| 8,723,370 B2 | 5/2014 | West |
| 8,779,627 B2 | 7/2014 | Gerhardinger et al. |
| 8,853,520 B2 | 10/2014 | Ueda et al. |
| 8,911,264 B2 | 12/2014 | Goyal et al. |
| 8,937,249 B2 | 1/2015 | Solon |
| 9,437,985 B2 | 9/2016 | Goyal et al. |
| 9,502,879 B2 | 11/2016 | Takasu |
| 9,564,281 B2 | 2/2017 | Gilman et al. |
| 9,648,762 B2 | 5/2017 | Boe |
| 10,553,739 B1 | 2/2020 | Solon |
| 10,992,254 B2 | 4/2021 | Solon |
| 11,689,153 B2 | 6/2023 | Solon |
| 12,015,375 B2 | 6/2024 | Solon |
| 12,015,376 B2 | 6/2024 | Solon |
| 2002/0041944 A1 | 4/2002 | Stavnes et al. |
| 2005/0077994 A1 | 4/2005 | Martin et al. |
| 2005/0110607 A1 | 5/2005 | Babic et al. |
| 2007/0132539 A1 | 6/2007 | Richter et al. |
| 2008/0011347 A1 | 1/2008 | Aoyama et al. |
| 2009/0088032 A1 | 4/2009 | Keeven et al. |
| 2009/0291594 A1 | 11/2009 | Donth et al. |
| 2009/0300909 A1 | 12/2009 | Kummer et al. |
| 2010/0090851 A1 | 4/2010 | Hauser |
| 2010/0139733 A1 * | 6/2010 | Jonczyk ............... H01H 85/201 174/72 A |
| 2010/0207716 A1 | 8/2010 | Yen |
| 2010/0258157 A1 | 10/2010 | Arai |
| 2011/0011642 A1 * | 1/2011 | Solon ...................... H02S 40/34 174/72 A |
| 2011/0104925 A1 | 5/2011 | Quiter et al. |
| 2011/0174521 A1 | 7/2011 | Hernandez-Hernandez et al. |
| 2011/0209741 A1 * | 9/2011 | Solon ................. H01H 85/0241 174/72 A |
| 2011/0232963 A1 | 9/2011 | Kono et al. |
| 2011/0300730 A1 | 12/2011 | Someya |
| 2011/0308833 A1 | 12/2011 | West |
| 2012/0019346 A1 | 1/2012 | Levi |
| 2012/0085040 A1 | 4/2012 | Ketwitz, Jr. |
| 2012/0125395 A1 | 5/2012 | Bellacicco et al. |
| 2012/0161919 A1 | 6/2012 | Von zur Muehlen |
| 2012/0181973 A1 | 7/2012 | Lyden |
| 2012/0217973 A1 | 8/2012 | Avrutsky |
| 2012/0309232 A1 | 12/2012 | Darr et al. |
| 2012/0313278 A1 | 12/2012 | Nishio et al. |
| 2013/0037294 A1 | 2/2013 | Blaha et al. |
| 2013/0077249 A1 | 3/2013 | Guinn |
| 2013/0257154 A1 | 10/2013 | Tagliamonte |
| 2013/0269746 A1 | 10/2013 | Ramsey |
| 2014/0113500 A1 | 4/2014 | Goyal et al. |
| 2016/0072431 A1 | 3/2016 | Solon |
| 2016/0133422 A1 | 5/2016 | Breili |
| 2016/0149539 A1 | 5/2016 | Franke et al. |
| 2021/0226581 A1 | 7/2021 | Solon |
| 2023/0336118 A1 | 10/2023 | Solon |
| 2024/0097614 A1 | 3/2024 | Solon |
| 2024/0333210 A1 | 10/2024 | Solon |

FOREIGN PATENT DOCUMENTS

| | | |
|---|---|---|
| CN | 1395056 | 2/2003 |
| CN | 2562350 | 7/2003 |
| CN | 2660691 | 12/2004 |
| CN | 2785100 | 5/2006 |
| CN | 201134283 | 10/2008 |
| CN | 101527235 | 9/2009 |
| CN | 101577158 | 11/2009 |
| CN | 201387761 | 1/2010 |
| CN | 201518320 | 6/2010 |
| CN | 101923915 | 12/2010 |
| CN | 201682254 | 12/2010 |
| CN | 201750032 U | 2/2011 |
| CN | 201845580 | 5/2011 |
| CN | 201877150 | 6/2011 |
| CN | 102117976 | 7/2011 |
| CN | 201975362 | 9/2011 |
| CN | 201994507 | 9/2011 |
| CN | 102332345 | 1/2012 |
| CN | 202153443 | 2/2012 |
| CN | 202256574 | 5/2012 |
| CN | 202258411 | 5/2012 |
| CN | 102568970 | 7/2012 |
| CN | 202434452 | 9/2012 |
| CN | 202524026 | 11/2012 |
| CN | 202758911 | 2/2013 |
| CN | 103000468 | 3/2013 |

(56) References Cited

FOREIGN PATENT DOCUMENTS

| | | |
|---|---|---|
| CN | 202797033 | 3/2013 |
| CN | 103165235 | 6/2013 |
| CN | 202977351 | 6/2013 |
| CN | 203038709 | 7/2013 |
| CN | 203102969 | 7/2013 |
| CN | 203118602 | 8/2013 |
| CN | 104021860 | 9/2014 |
| CN | 203967369 | 11/2014 |
| CN | 104205514 | 12/2014 |
| CN | 104464920 | 3/2015 |
| CN | 204463897 | 7/2015 |
| CN | 204558134 | 8/2015 |
| CN | 204760094 | 11/2015 |
| DE | 6940839 | 4/1971 |
| DE | 202006007613 | 8/2006 |
| DE | 102006032275 | 1/2008 |
| DE | 102008027189 | 1/2009 |
| DE | 202008016324 U1 | 3/2009 |
| DE | 102012218366 | 2/2014 |
| DE | 102013106255 | 12/2014 |
| EP | 0136154 A2 | 4/1985 |
| EP | 2287915 | 2/2011 |
| EP | 2495825 | 9/2012 |
| EP | 2645425 | 10/2013 |
| FR | 2983361 | 5/2013 |
| JP | S52135081 A | 11/1977 |
| JP | S585292 Y2 | 1/1983 |
| JP | 59-194327 | 11/1984 |
| JP | 60-236430 | 11/1985 |
| JP | 2-23016 | 1/1990 |
| JP | 1992041733 | 9/1992 |
| JP | 6-84410 | 3/1994 |
| JP | H0684410 A | 3/1994 |
| JP | 3004630 | 11/1994 |
| JP | 8-289450 | 11/1996 |
| JP | H08289451 | 11/1996 |
| JP | 9-245533 | 9/1997 |
| JP | H10135499 A | 5/1998 |
| JP | 2000004516 | 1/2000 |
| JP | 2000-348836 | 12/2000 |
| JP | 2003031834 | 1/2003 |
| JP | 2003-77584 | 3/2003 |
| JP | 2003-293536 | 10/2003 |
| JP | 2005-39981 | 2/2005 |
| JP | 4044484 | 2/2008 |
| JP | 4080663 | 4/2008 |
| JP | 2008166492 | 7/2008 |
| JP | 2008187814 | 8/2008 |
| JP | 4-171359 | 10/2008 |
| JP | 4169490 | 10/2008 |
| JP | 4169490 B2 | 10/2008 |
| JP | 2009-148010 | 7/2009 |
| JP | 4606774 | 1/2011 |
| JP | 4730794 | 7/2011 |
| JP | 2011-253739 | 12/2011 |
| JP | 2012-115043 | 6/2012 |
| JP | 5384073 | 1/2014 |
| JP | 2014-50227 | 3/2014 |
| JP | 2014-229639 | 12/2014 |
| JP | 2015-60813 | 3/2015 |
| JP | 2015-133822 | 7/2015 |
| JP | 2015-198508 | 11/2015 |
| KR | 10-0329882 | 10/2003 |
| KR | 200446192 | 10/2009 |
| KR | 200455299 | 8/2011 |
| KR | 10-1428689 | 8/2014 |
| KR | 101428689 B1 | 8/2014 |
| MX | 2011013979 | 6/2012 |
| WO | 84/00078 | 1/1984 |
| WO | 90/11608 | 10/1990 |
| WO | 01/09990 | 2/2001 |
| WO | 2010/124614 | 11/2010 |
| WO | 2011/076955 | 6/2011 |
| WO | 2012/023748 | 2/2012 |
| WO | 2012/083785 | 6/2012 |
| WO | 2012/166412 | 6/2012 |

OTHER PUBLICATIONS

Balance of Systems Product Catalog 2013, Shoals Technologies Group, 36 pgs.
Definition of "voltage rating", retrieved from https://encyclopedia2.thefreedictionary.com/voltage+rating on Sep. 18, 2018, 2 pgs.
Enphase Engage Cable and Accessories Installation Manual, Enphase Energy, 2011, 28 pgs.
HelioFuse Datasheet, Amphenol, 3 pgs.
Helukabel "Cable systems for photovoltaic installations" and product disclosures, Helukabel, 2011, 72 pgs.
Jurchen Technology—Components for photovoltaic systems, retrieved from http://web.archive.org/web/20120428223249/http://www.jurchen-technology.com/ on 2012, 2 pgs.
Jurchen Technology—Components for photovoltaic systems, retrieved from http://web.archive.org/web/20140208150811/http://www.jurchen-technology.com/ on Oct. 9, 2023, 2 pgs.
Jurchen Technology "DC Cabling Perfectly Connected", 2014, 20 pgs.
Jurchen Technology—DC Verkabelung retrieved from https:web.archive.orgweb20131030021022http:www.jurchen-technology.de:80fileadminredakteur_verzeichnispdfsBroschuerenJT_ProBro_DC_Verkabelung_2012_0920_DE_ebook.pdf.
Jurchen Technology—DC Verkabelung retrieved from https:web.archive.orgweb20130918085535http:www.jurchen-technology.defileadminredakteur_verzeichnispdfsJT_Produktbroschuere_DC_Verkabelung_20 12 0920 DE ebook.pdf.
Prnewswire, Molded In-line Fuse From Amphenol Protects Against Ground Fault Damage, published May 4, 2012, retrieved Dec. 22, 2022 from: https://www.prnewswire.c,om/news-releasestmolded-in-line-fuse-from-amphenol-3rotects-against-ground-fault-damage-150186315.html, 4 pgs.
Radox® Solar, Huber+Suhner Group, 2011 Ed, 60 pgs.
Shoals Technologies Group In-Line Fuses, 2010, 2 pgs.
Solar Line—Photovoltaic interconnection system, Amphenol industrial solar technologies, https://www.amphenol-industrial.com, Nov. 2012, 16 pgs.
SUNBOLTS Inline Fuse S417 Fuse Cable / Fuse Holder UL 1500V, https://www.bizlinktech.com/products, 2013, 2 pgs.
Sunnector Solar Assemblies & Harnesses, Cooper Interconnect, 2011, 16 pgs.
"Wire Gauges—Current Ratings", retrieved from https://web.archive.org/web/20140715051530/www.engineeringtoolbox.conn/ wire-gauges-d_419.html on Jun. 6, 2019, Year: 2015, 2 pgs.
The World of Lapp—Products for photovoltaic 2012, Lapp Group, 2012, 44 pgs.
Amphenol Industries Solar Technologies—Solar Line Photovoltaic Interconnection System Catalog (22 pages).
Burndy Catalog at H-21, H-24, H-25, H-26 (82 pages).
CATPG87.pdf, ILSCO Catalog at 87 (1 page).
Form-14, Information Sheet Series AH (1 page).
Helukabel Green Line—Cable Solutions for Photovoltaic Systems: From the solar cell to the grid (6 pages).
Helukabel Green Line—Solarflex-X PVF-1 data sheet (2 pages).
International Standard—International Electrotechnical Vocabulary—Part 461: Electrical Cables (180 pages).
J0307, AH-1 Drawing, Exemplary of AH Series (1 page).
J0308, AH-2 Drawing, Exemplary of AH Series (1 page).
Sales Drawing 042248-01, "Conductor Ranges Accommodated" (1 page).
Sales Drawing 045569-01, YP-AU, YP-U, YC-U, YPC-U, installed view (1 page) Sunnector, at 1, 3-13 (16 pages).
Sunnector, at 1, 3-13 (16 pages).

\* cited by examiner

LEAD ASSEMBLY FOR CONNECTING SOLAR PANEL ARRAYS TO INVERTER

CROSS-REFERENCE TO RELATED APPLICATIONS

This application is a continuation of U.S. application Ser. No. 18/739,127, filed Jun. 10, 2024, which is a continuation of U.S. application Ser. No. 18/341,655, filed Jun. 26, 2023, which is a continuation of U.S. application Ser. No. 17/301,609, filed Apr. 8, 2021, which is a continuation of U.S. application Ser. No. 14/849,458, filed Sep. 9, 2015, which claims the benefit of and priority to U.S. Provisional application No. 62/047,773, filed Sep. 9, 2014. Each of the foregoing applications is incorporated herein by reference in its entirety.

BACKGROUND

Disclosed embodiments relate to electrical components, and more specifically to assemblies for connecting solar panel arrays to an inverter, without the need of a combiner box.

As depicted in FIG. 1, a conventional solar power configuration includes a plurality of solar panels 30 each connected to a central combiner box 36, and a plurality of combiner boxes (not shown) connected to an inverter. The inverter converts the direct current (DC) generated by the solar panels into alternating power (AC), which goes in the "grid".

The configuration of FIG. 1 has been simplified in recent years by the wire harness of U.S. Pat. No. 8,604,342 which issued Dec. 10, 2013; and U.S. application Ser. No. 14/057,089 filed Oct. 18, 2013; and Ser. No. 14/296,726 filed Jun. 5, 2014, all of which are hereby incorporated by reference. More specifically, as shown in FIG. 2, wire harnesses 34 connect multiple solar panels 30 in an array 32, so each array has a single input via wire harness 34 into the combiner box. This has drastically reduced the number of connections going into a combiner box, which is safer, more reliable, easier to install, maintain and troubleshoot, and saves money over the conventional configuration of FIG. 1.

Unfortunately, however, a combiner box is still a necessary component in known solar power installations because the energy coming from solar arrays must be combined prior to going into the inverter. Combiner boxes are problematic because they are clumsy, prone to damage and malfunctioning, must be periodically maintained, and require extensive planning and skill for installation. Due to the many connections going into a combiner box, a combiner box cannot easily be moved without disconnecting and reconnecting all the connections and wiring, which requires considerable manpower, danger, and expense.

As can be seen, there is a need for a device that renders a combiner box unnecessary. It is desirable that this device is small, inexpensive to manufacture and transport, and easy to use. It is also desirable that the device is extremely durable and can be adapted for a variety of circumstances.

SUMMARY OF DISCLOSED EMBODIMENTS

In an example embodiment, a lead assembly for use in a solar energy installation includes first and second feeder cables and multiple drop lines. The first feeder cable has a first diameter and a first polarity. The second feeder cable has a second diameter and a second polarity. Each of the first feeder cable and the second feeder cable contains two or more joints. Each joint electrically couples one or more drop lines to the first or second feeder cable at a nexus. Each drop line has a diameter that is less than the first diameter and less than the second diameter. Each drop line coupled to the first feeder cable is configured to be electrically connected to a wire harness configured to electrically connect to an array of solar panels. Two or more of the drop lines that are connected to the first feeder cable each includes an in line fuse disposed between the joint and the wire harness. Each joint has a mold enclosure configured to enclose at least a portion of the nexus.

In another example embodiment, a solar power system includes a lead assembly, a first wire harness, first solar panels, a second wire harness, and second solar panels. The lead assembly includes first and second feeder cables and multiple drop lines. The first feeder cable has a first diameter and a first polarity. The second feeder cable has a second diameter and a second polarity. Each of the first feeder cable and the second feeder cable contains two or more joints. Each joint electrically couples one or more drop lines to the first or second feeder cable at a nexus. Each drop line has a diameter that is less than the first diameter and less than the second diameter. Two or more of the drop lines that are connected to the first feeder cable each includes an in line fuse disposed between the joint and the wire harness. Each joint has a mold enclosure configured to enclose at least a portion of the nexus. The first wire harness includes a first central trunk and first branches. The first solar panels are electrically coupled by the first wire harness to form a first solar array. Each branch of the first branches electrically couples a different one of the first solar panels to the first central trunk. The second wire harness includes a second central trunk and second branches. The second solar panels are electrically coupled by the second wire harness to form a second solar array. Each branch of the second branches electrically couples a different one of the second solar panels to the second central trunk. A first drop line of the drop lines terminates at a first drop line connector. The first drop line connector connects to the first central trunk. The first drop line connector and the first drop line electrically couple the first solar array to the first or second feeder cable. A second drop line of the drop lines terminates at a second drop line connector. The second drop line connector connects to the second central trunk. The second drop line connector and the second drop line electrically couple the second solar array to the first or second feeder cable.

In another example embodiment, a lead assembly for use in a solar energy installation includes first and second drop lines, a feeder cable, an inline fuse, and a mold structure. The first drop line has a first diameter and terminates at a drop line connector. The drop line connector is configured to connect with a wire harness. The wire harness is configured to electrically connect to an array of solar panels. The second drop line has a second diameter. The feeder cable is electrically coupled to the first and second drop lines at a nexus. The feeder cable has a third diameter that is greater than the first diameter and greater than the second diameter. The inline fuse is disposed in the first drop line between the nexus and the drop line connector. The mold structure at least partially surrounds the nexus. The mold structure defines first, second, third, and fourth openings. The feeder cable extends from the first and second openings of the mold structure in opposite directions. A feeder cable passage extends completely through the mold structure between the first and second openings. The feeder cable extends through the feeder cable passage. The first drop line extends from the third opening of the mold structure. The second drop line extends from the fourth opening of the mold structure.

DETAILED DESCRIPTION OF EXAMPLE EMBODIMENTS

The following detailed description describes exemplary embodiments of the invention. The description is not to be taken in a limiting sense but is made merely for the purpose of illustrating the general principles of the invention, since the scope of the invention is best defined by the appended claims.

The following structure numbers shall apply to the following structures among the various FIGS.:
10—Lead assembly;
12—Drop line;
13—Drop line connector;
14—Feeder cable;

15—Feeder cable connector;
16—Insulation;
17—Joint;
18—Exposed wire;
19—Nexus;
20—Compression lug;
22—Undermold;
24—Overmold;
25—Aperture;
27—Trunk buss jumper;
29—In line fuse;
30—Solar panel;
32—Solar array;
34—Wire harness;
35—Wire harness connector;
36—Combiner box; and
38—Inverter.

Figure 1:
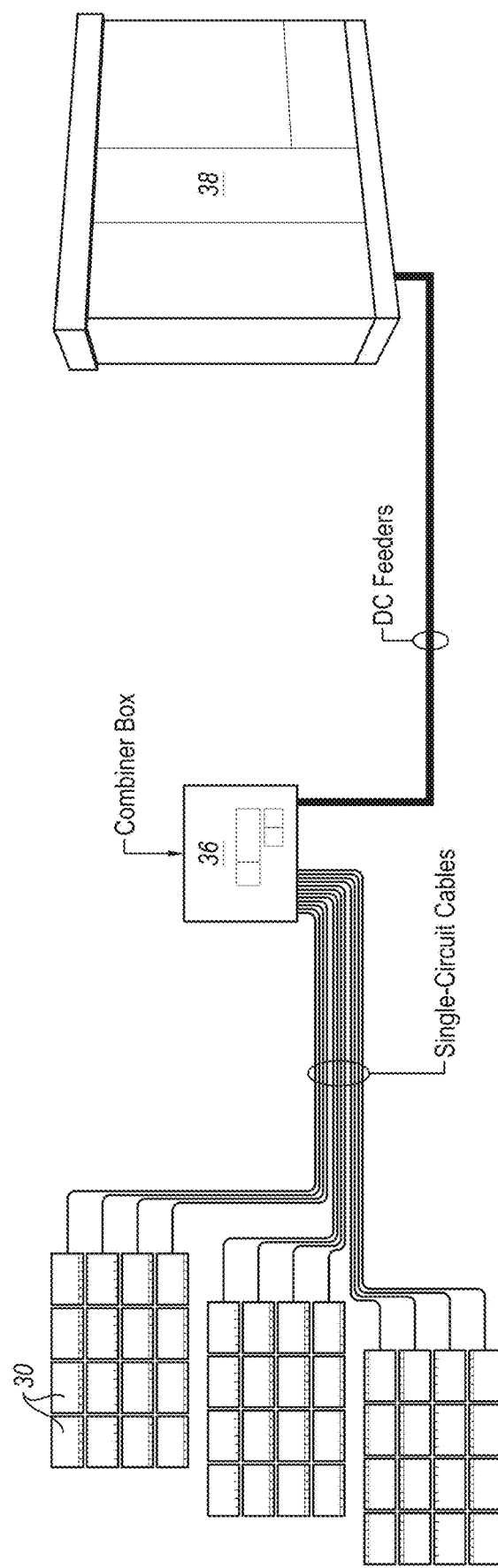
FIG. 1 depicts a conventional wiring configuration with each solar panel individually wired to a central combiner box.
Figure 2:
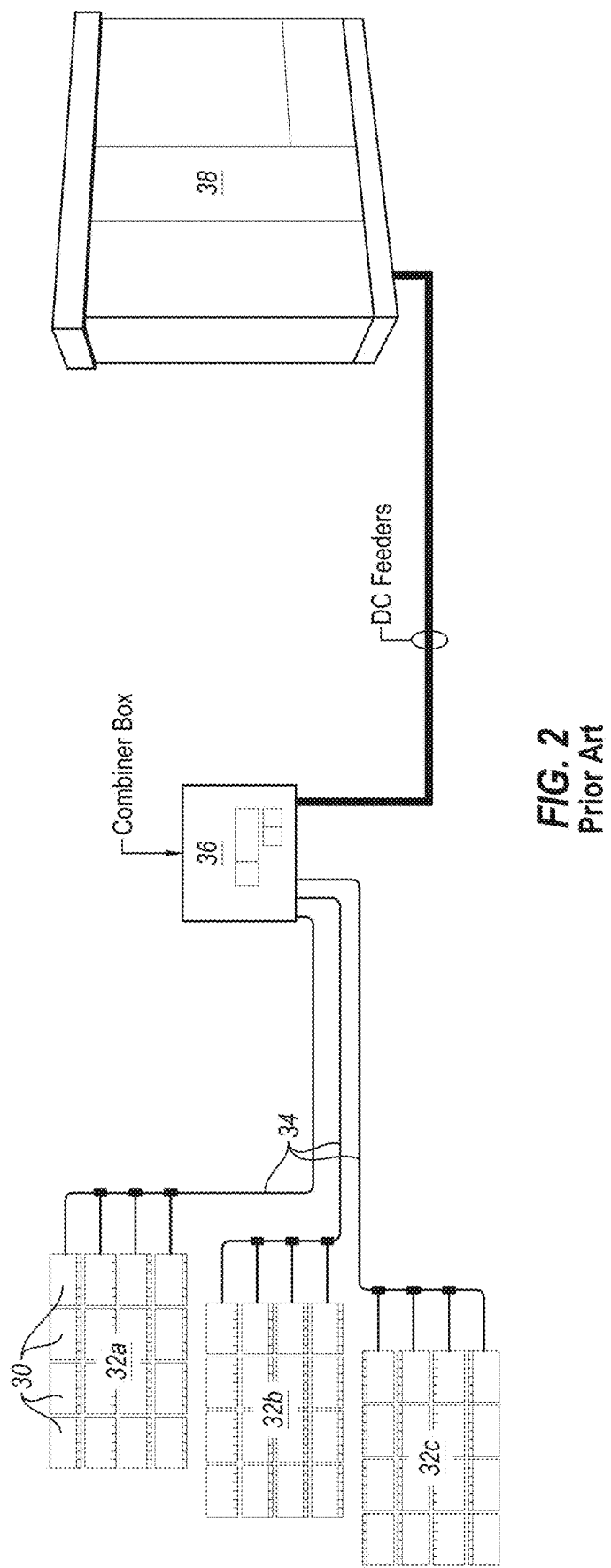
FIG. 2 depicts an improved but known wiring configuration with solar panels harnessed together to form solar arrays, with each solar array individually wired to a central combiner box.
Figure 3:
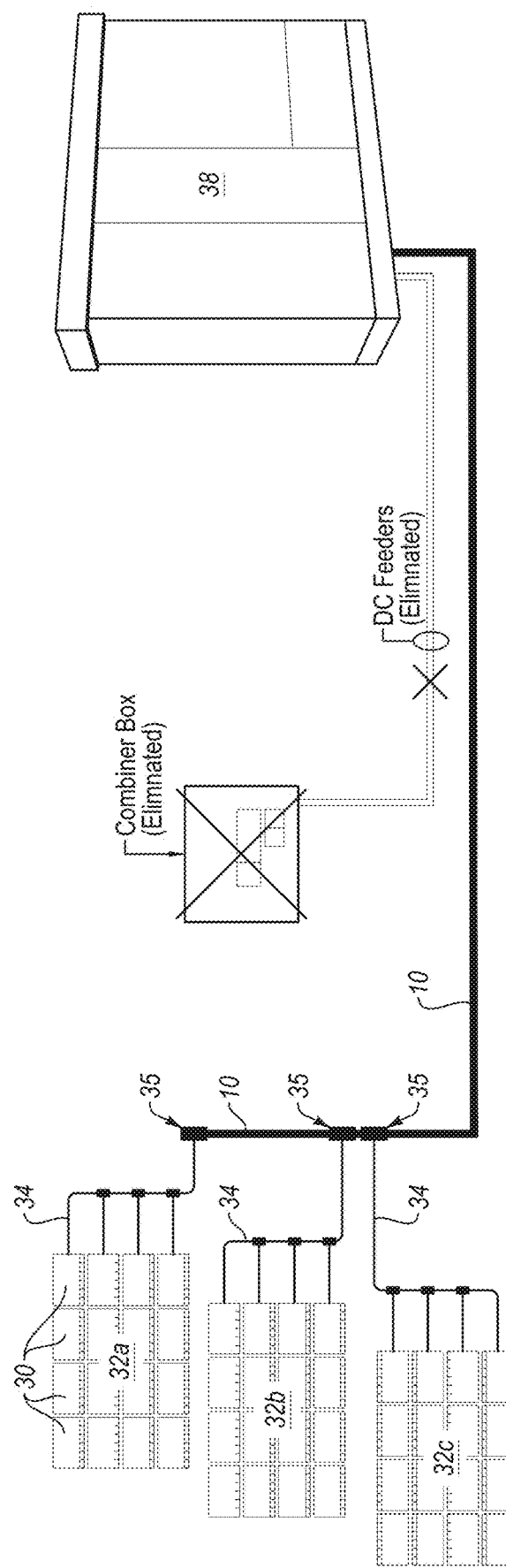
FIG. 3 depicts the present invention of a plurality of wire harnesses coupled to a lead assembly that connects to an inverter, with the unnecessary combiner box shown for demonstration only.
Figure 4:
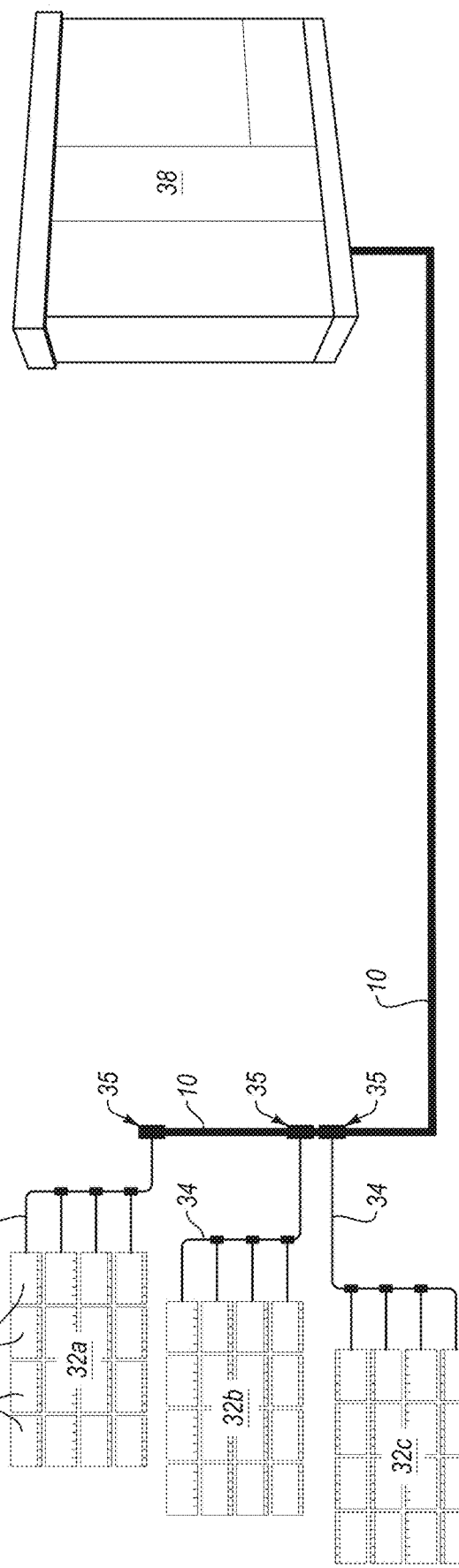
FIG. 4 schematically represents a system of the present invention.

Referring to FIG. 3, a system of the present invention generally includes a plurality of solar panels 30 that are electrically coupled to form solar arrays 32a, 32b, and so forth. Panels 30 are preferably coupled using wire harnesses 34 which are commercially available from Shoals Technologies Group of Portland, TN. Each wire harness includes a plurality of branches each connecting to one solar panel, and a central trunk that terminates in wire harness connector 35. Each wire harness is connected at wire harness connector 35 to drop line connector 13 (not shown) of lead assembly 10.

As shown in FIG. 3, solar arrays 32a, 32b and 32c are connected to a lead assembly 10. A single lead assembly 10 can reasonably accommodate approximately 200 Kw.

Figure 5:
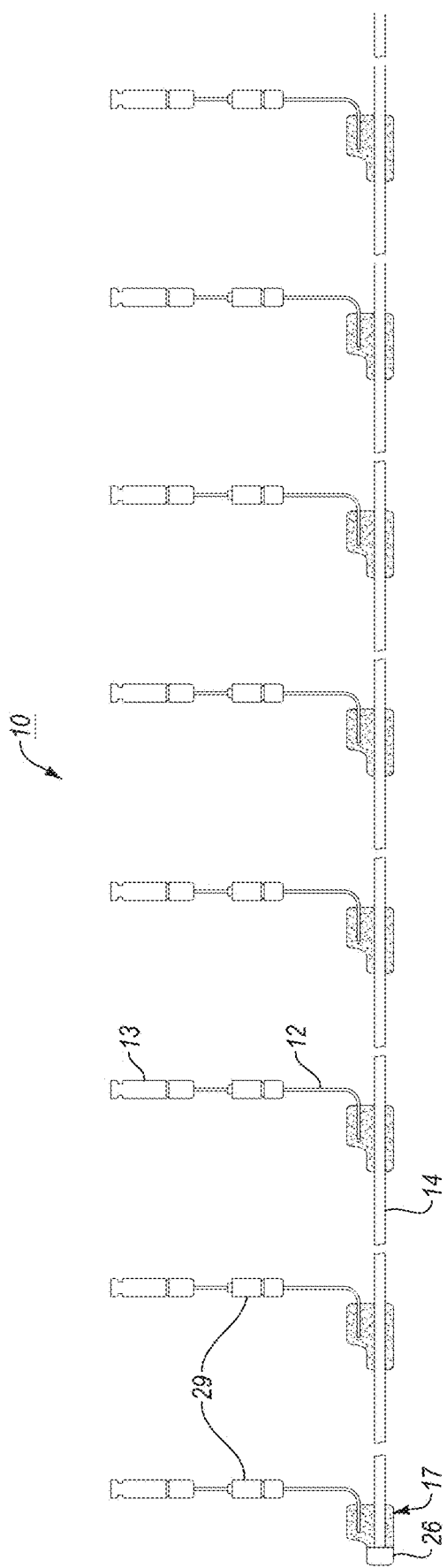
FIG. 5 depicts a positive lead assembly having a single drop line per joint.
Figure 6:
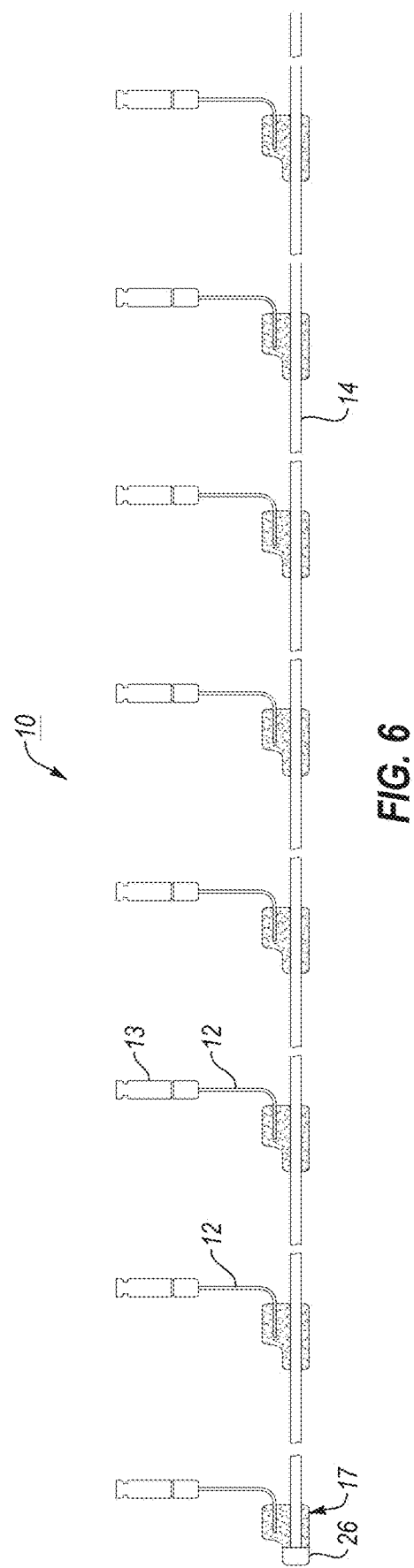
FIG. 6 depicts a negative lead assembly having a single drop line per joint.
Figure 7:
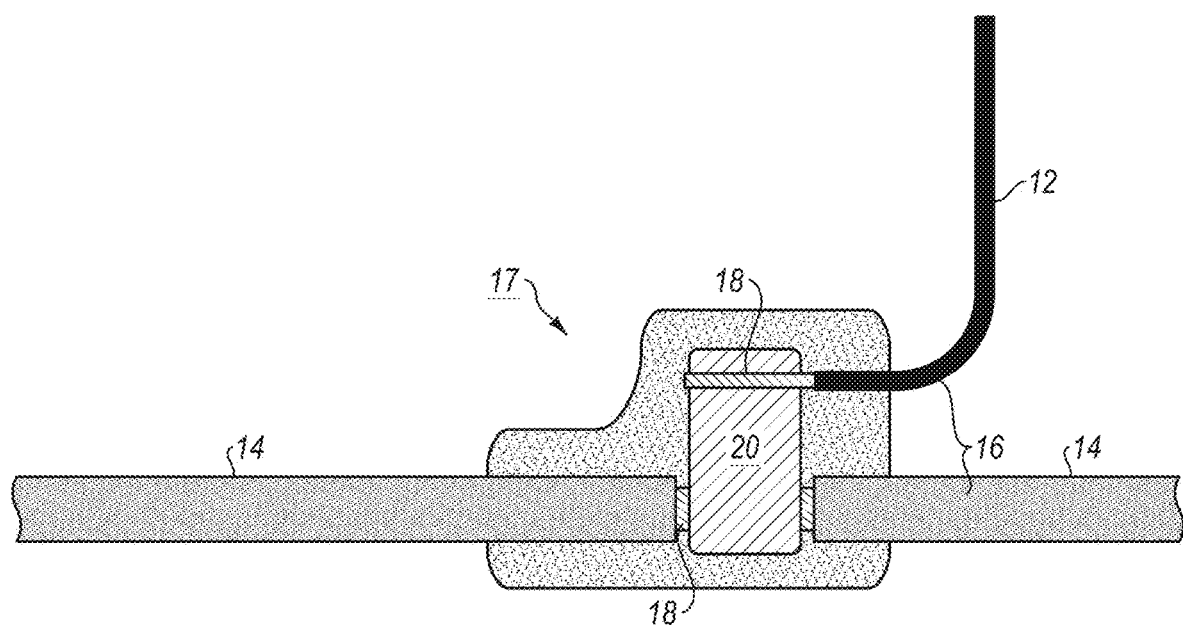
FIG. 7 schematically depicts a joint with a compression lug.
Figure 8:
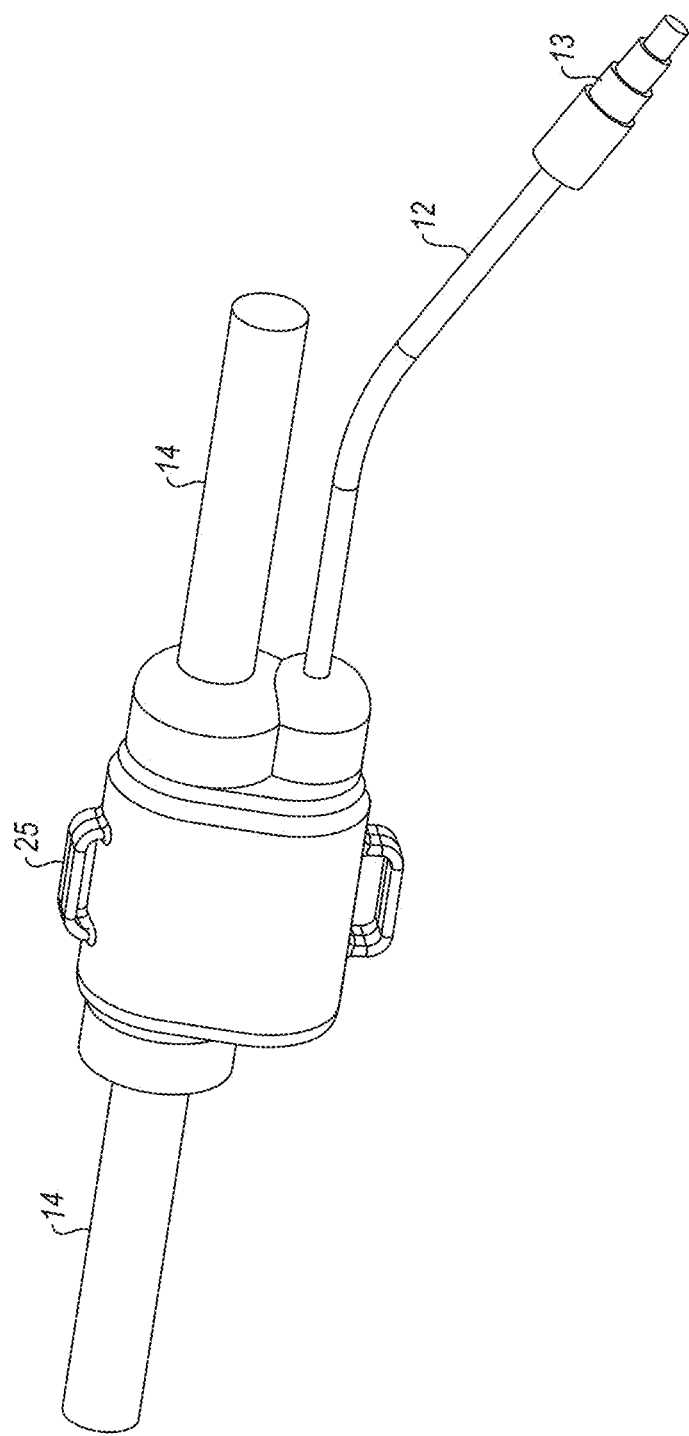
FIG. 8 depicts a single drop joint.

While FIG. 5 depicts a positive lead assembly having in line fuses 29, and FIG. 6 depicts a negative lead assembly without in line fuses, it should be understood that positive lead assemblies may lack in line fuses and negative lead assemblies may include in line fuses.

Figure 29:
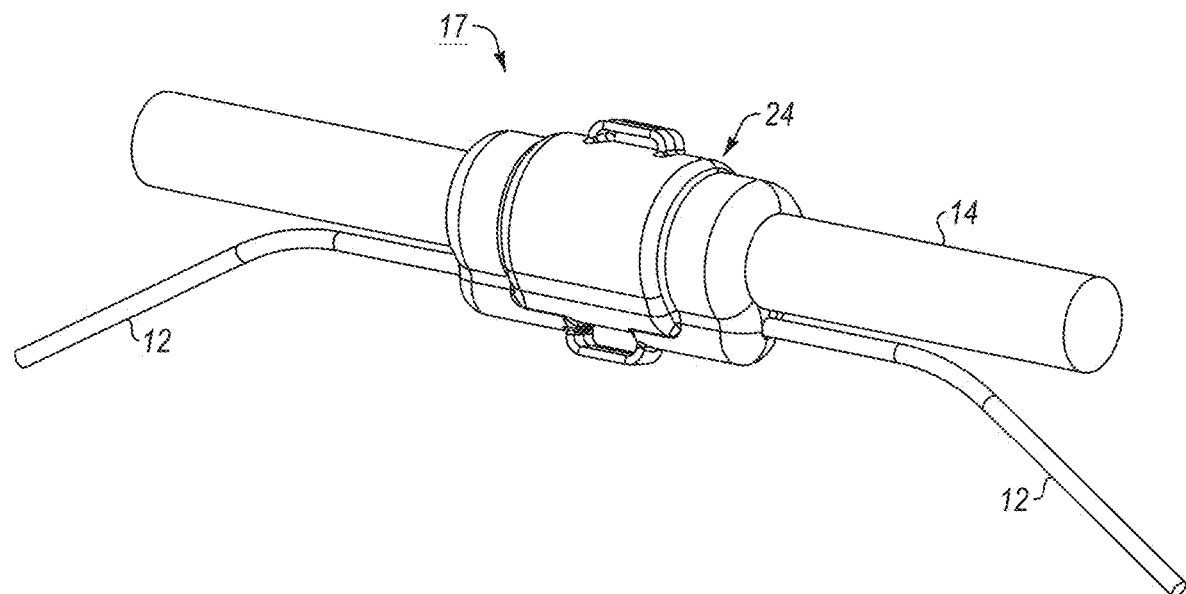
FIG. 29 depicts a dual drop lead assembly for 750MCM cable.
Figure 33:
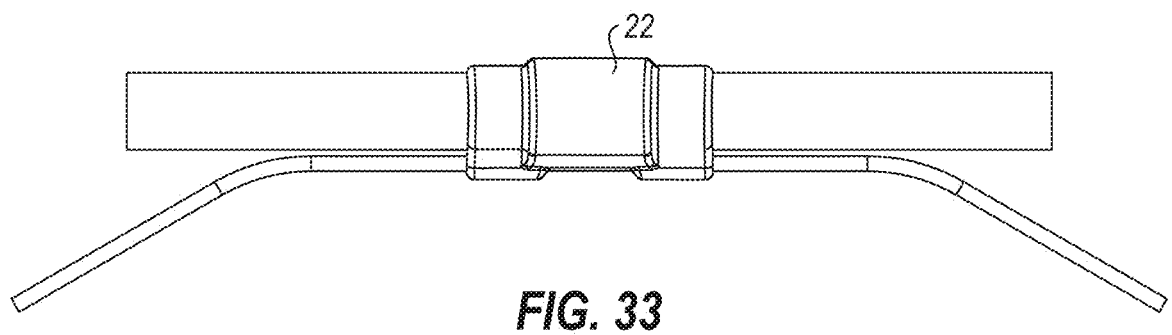
FIG. 33 depicts a dual drop lead assembly for 750MCM cable with undermold shown.
Figure 34:
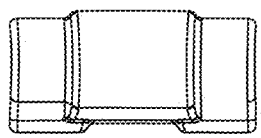
FIG. 34 depicts the undermold for a dual drop lead assembly for 750MCM cable.
Figure 35:
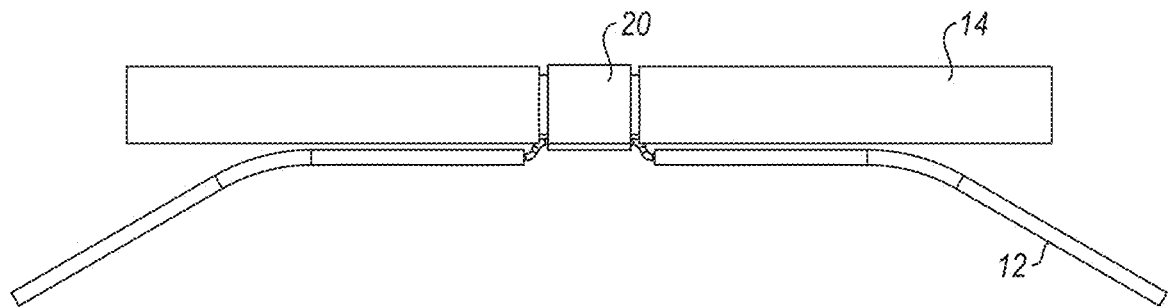
FIG. 35 depicts a dual drop lead assembly for 750MCM cable with compression lug shown.
Figure 36:
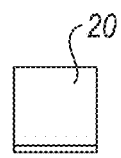
FIG. 36 depicts the compression lug for a dual drop lead assembly for 750MCM cable.

Referring now to FIG. 5, lead assembly 10 generally includes drop line 12 joined to feeder cable 14 at joint 17. As shown in FIG. 35, the drop line and feeder cable are held together by compression lug 20, which is surrounded by undermold 22 (FIG. 33), which is surrounded by overmold 24 (FIG. 29). Overmold 24 preferably defines at least one aperture 25 for receiving zip-ties, and the like, for securing the assembly upon installation.

Figure 30:
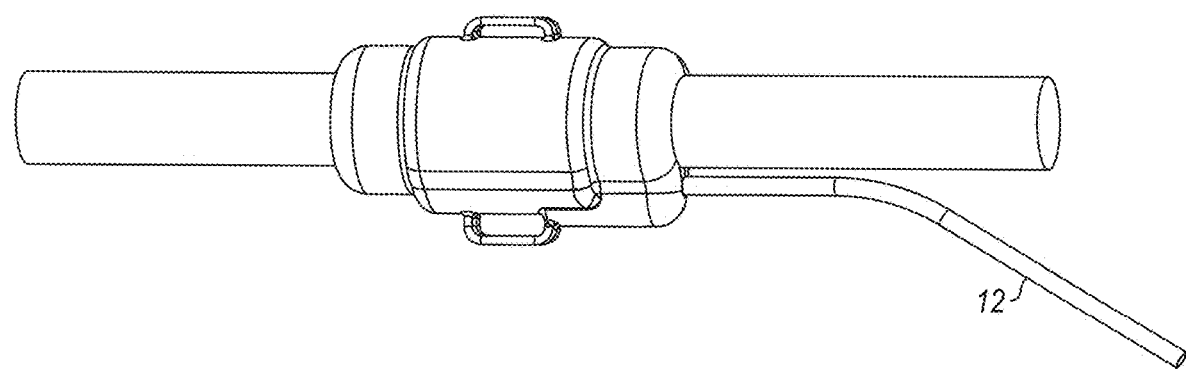
FIG. 30 depicts a single drop lead assembly for 750MCM cable.
Figure 31:
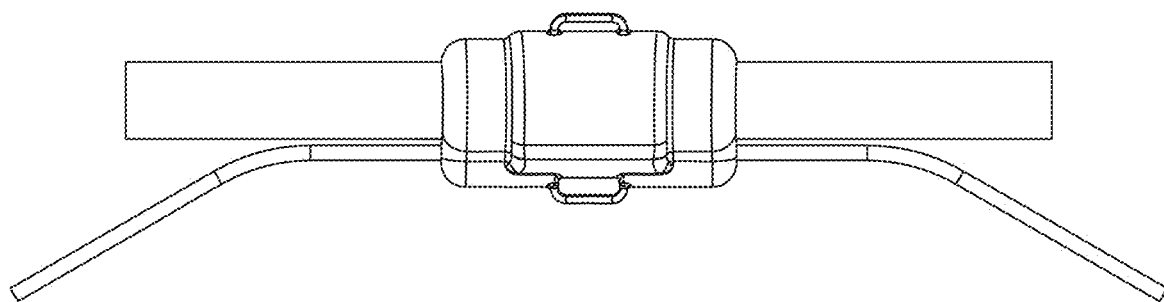
FIG. 31 depicts a dual drop lead assembly for 750MCM cable with overmold shown.
Figure 32:
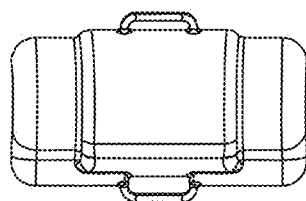
FIG. 32 depicts the overmold for a dual drop lead assembly for 750MCM cable.

Each drop line 12 terminates in drop line connector 13, which connects drop line 12 to wire harness connector 35. Drop line 12 is preferably constructed of 18 to 4 gauge wire, and drop line connectors 13 are preferably off-the-shelf connectors such as MC4/PV-KBT4/61-UR & PV-KST4/61-UR from Multi-Contact of Windsor, CA. Joint 17 of lead assembly 10 may include a single drop line 12, as shown in FIG. 30, or dual drop lines 12, as shown in FIG. 29, corresponding with connecting to a single wire harness or two wire harnesses, respectively. Whether a single or dual drop line is most suitable depends on the configuration of the solar arrays in a field.

Figure 9:
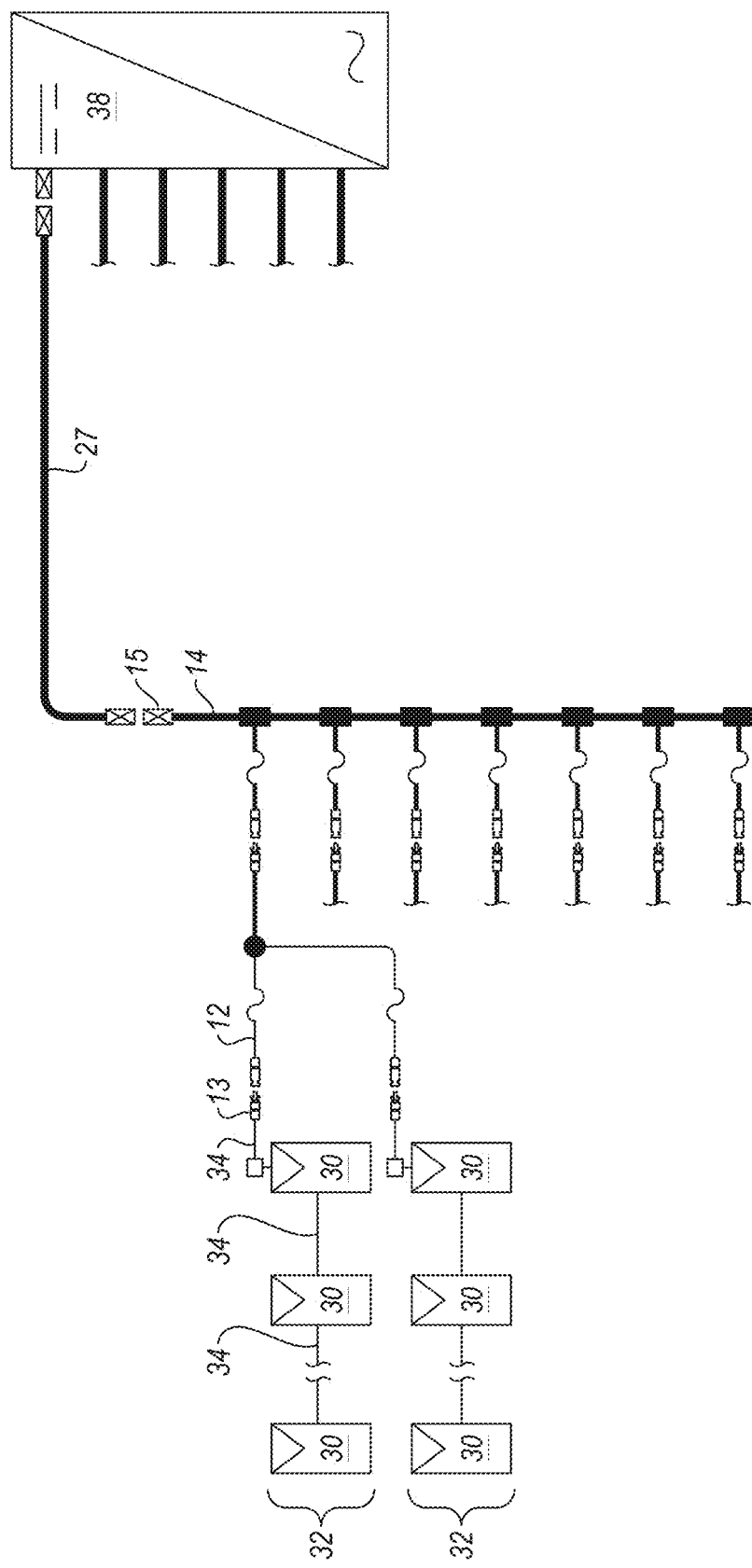
FIG. 9 depicts a configuration where a lead assembly has a single drop line as may be appropriate in use with crystalline panels.
Figure 10:
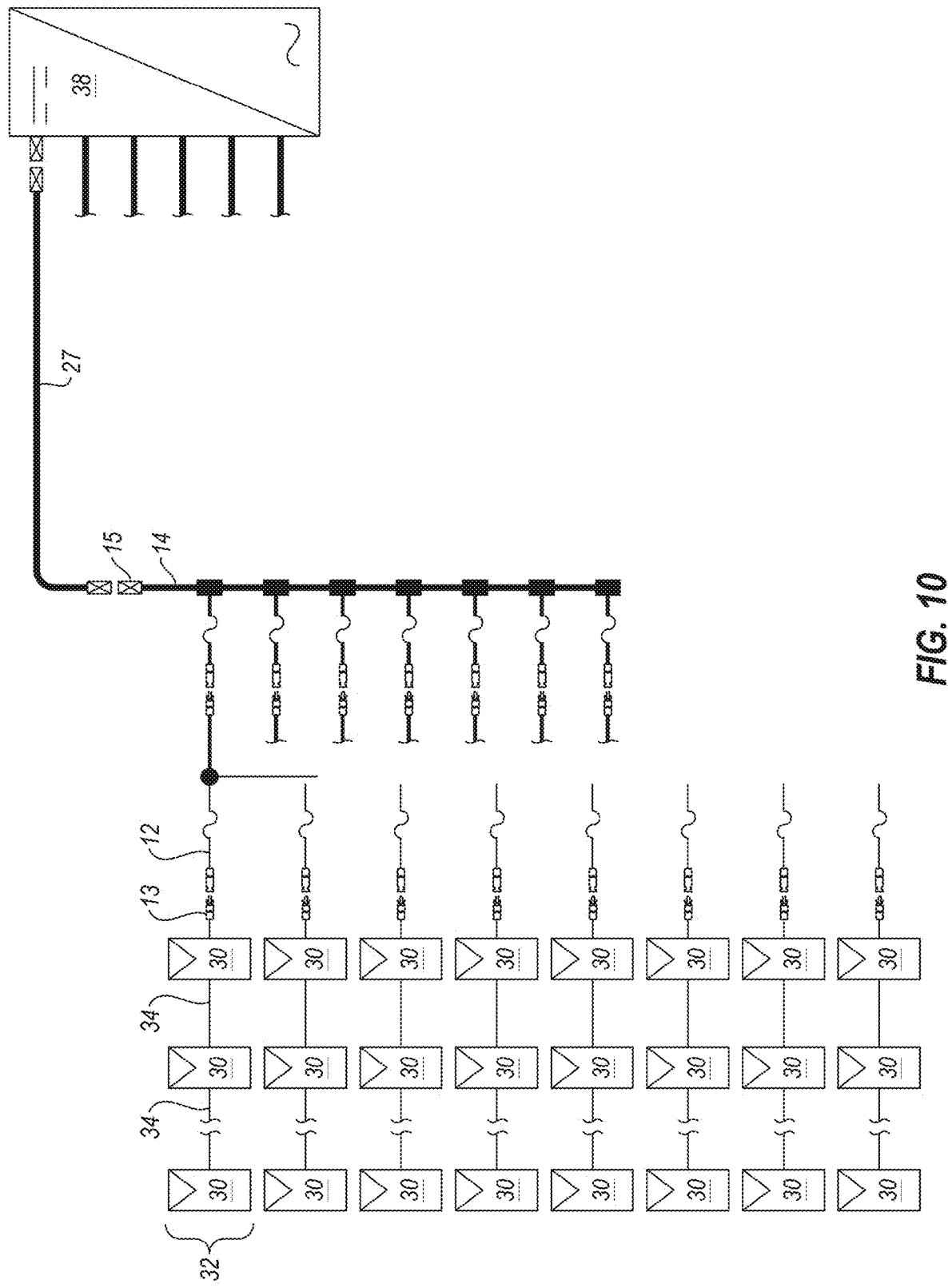
FIG. 10 depicts a configuration where a lead assembly has a single drop line as may be appropriate in use with thin film panels.
Figure 12:
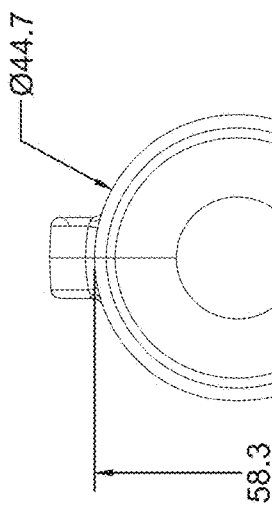
FIGS. 11-12 depict the overmold for a dual drop lead assembly for 250 mcm cable.
Figure 14:
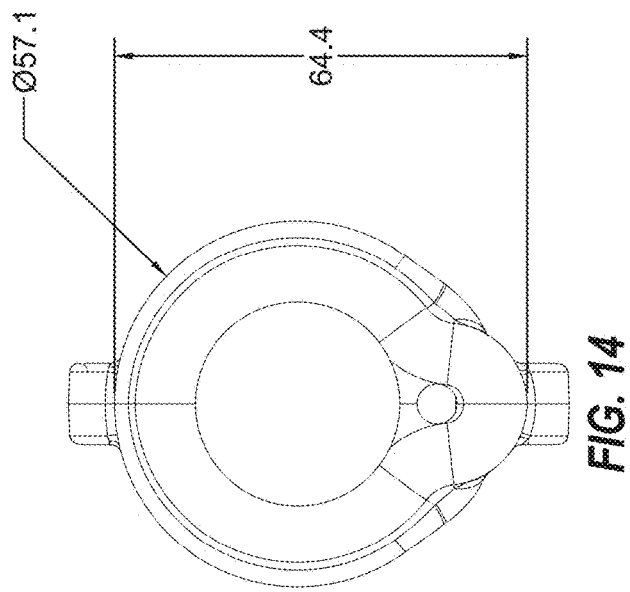
FIGS. 13-14 depict the overmold for a dual drop lead assembly for 750MCM cable.
Figure 11:
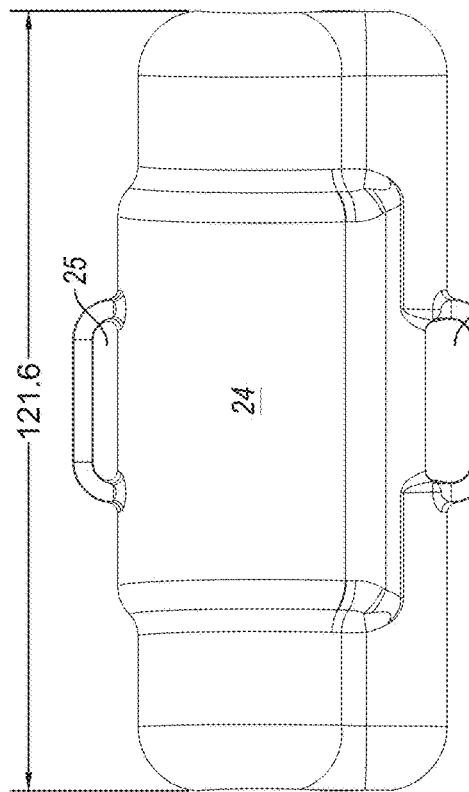
Figure 13:
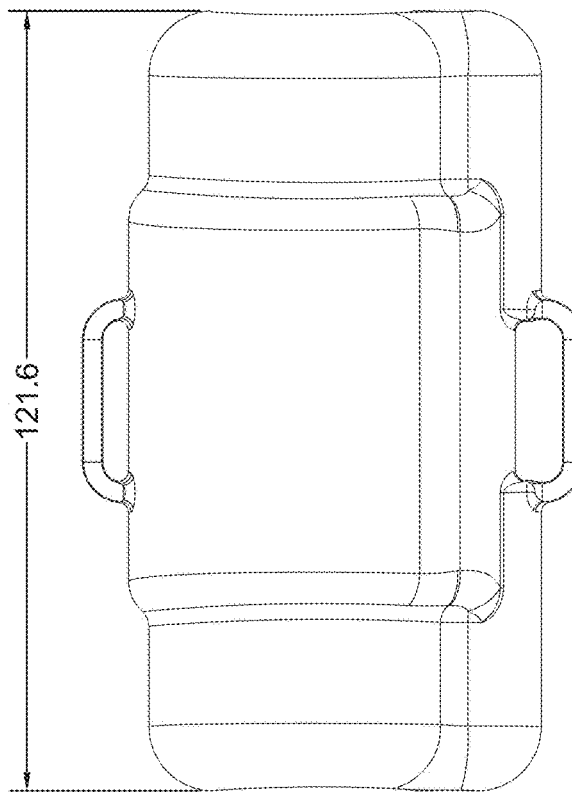
Figure 16:
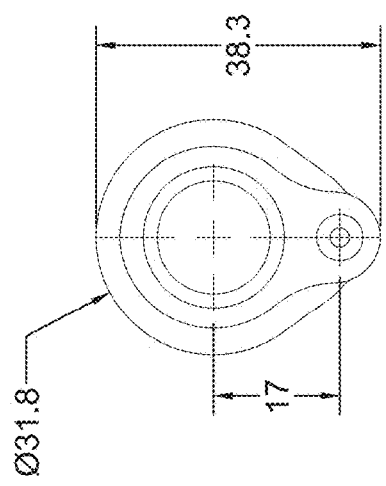
FIGS. 15-16 depict the undermold for a dual drop lead assembly for 250MCM cable.
Figure 18:
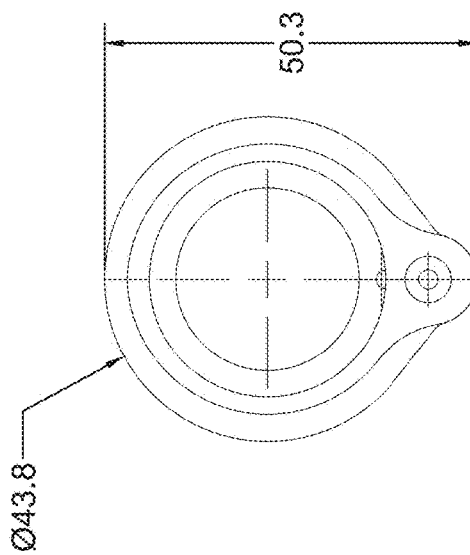
FIGS. 17-18 depict the undermold for a dual drop lead assembly for 750MCM cable.
Figure 15:
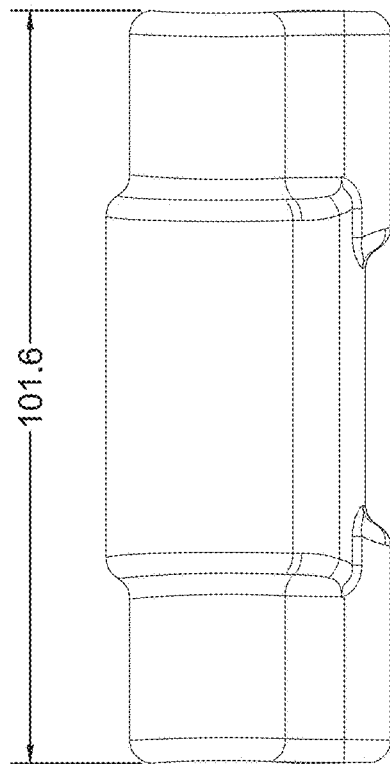
Figure 17:
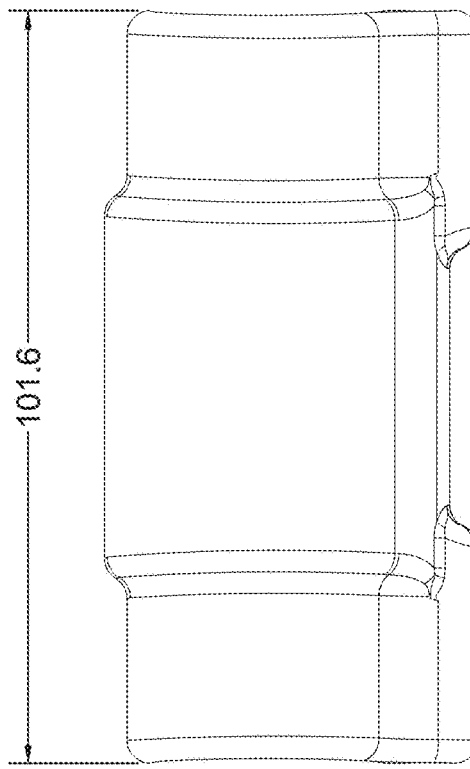
Figure 20:
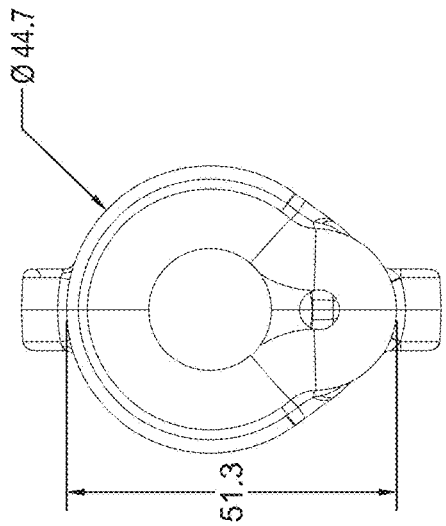
FIGS. 19-20 depict the overmold for a single drop lead assembly for 250MCM cable.
Figure 22:
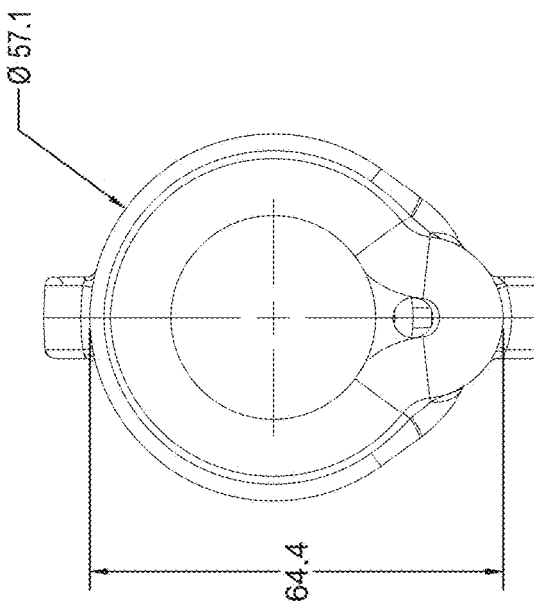
FIGS. 21-22 depict the overmold for a single drop lead assembly for 750MCM cable.
Figure 19:
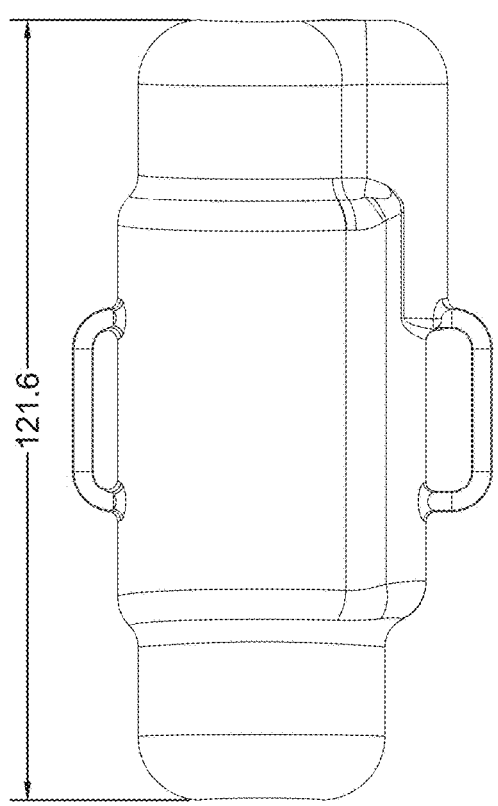
Figure 21:
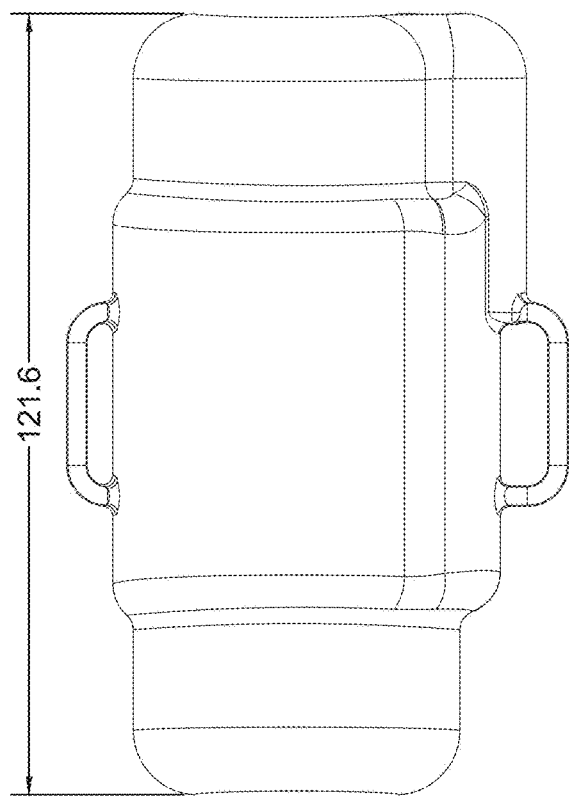
Figure 24:
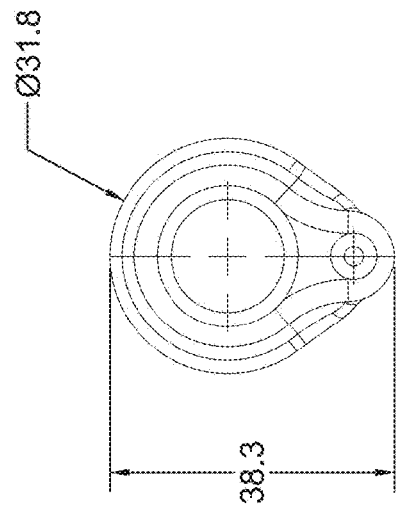
FIGS. 23-24 depict the undermold for a single drop lead assembly for 250MCM cable.
Figure 26:
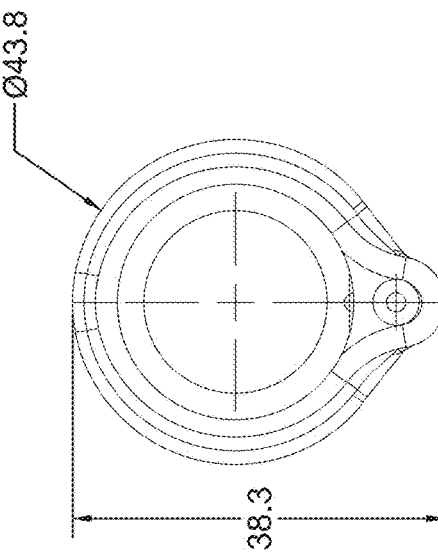
FIGS. 25-26 depict the undermold for a single drop lead assembly for 750MCM cable.
Figure 23:
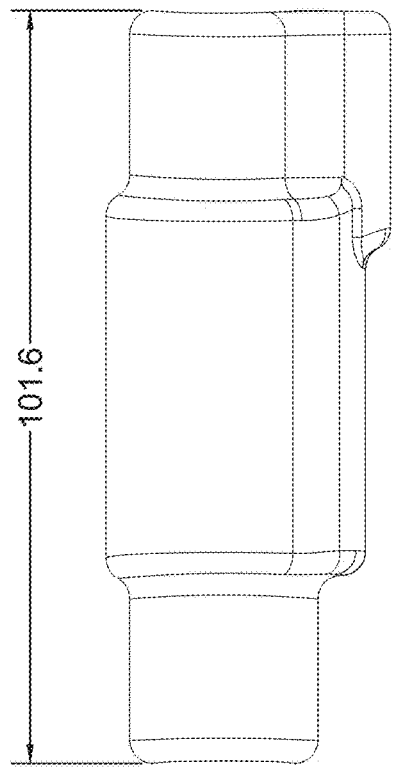
Figure 25:
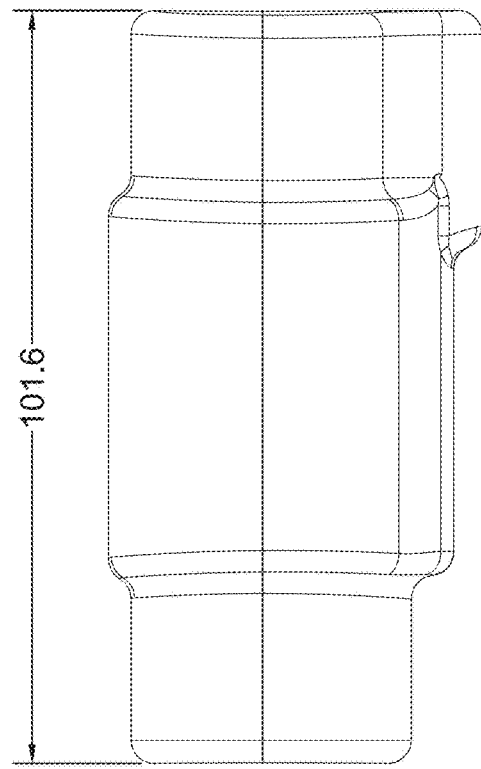

By way of example and referring to FIG. 10, in a solar installation having thin film panels, which occupy a large area of space, it may be advantageous to employ single drop assemblies because it is impractical to physically reach wire harnesses that are very spread out. Alternatively and referring to FIG. 9, in a solar installation having crystalline panels, which occupy a smaller area of space, it may be advantageous to employ dual drop assemblies because the associated wire harnesses are relatively close to one another and can be connected to a single lead assembly.

It is also important to understand that the configuration of a particular lead assembly can be modified to accommodate different solar installations. For example, joints 17 and corresponding drop lines 12 can be spaced close together (approximately 15 cm), or far apart (approximately 15000 cm), along feeder cable 14, depending on the density of solar panels. Also, spacing of joints 17 and corresponding drop lines 12 can vary on a single lead assembly.

Figure 27:
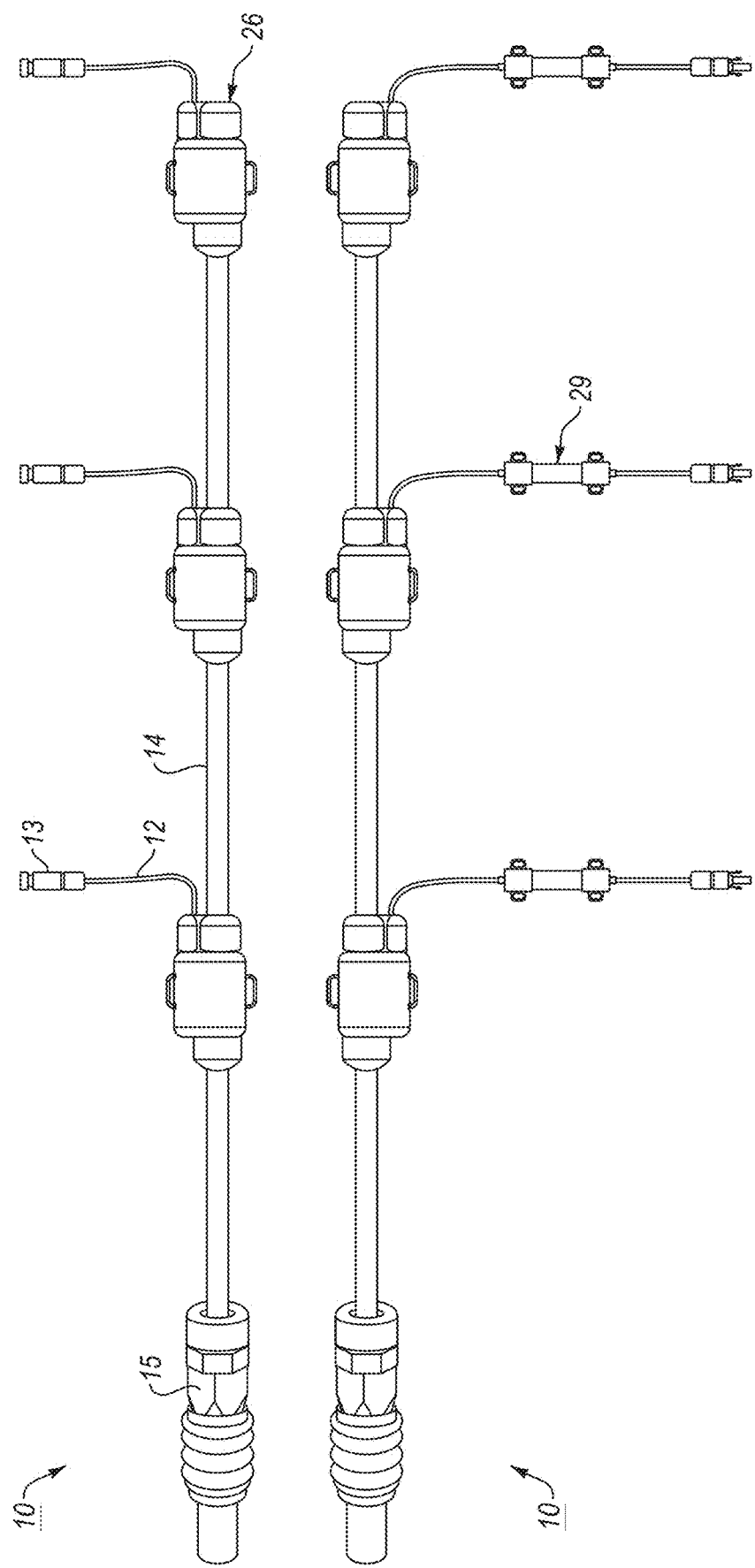
FIG. 27 depicts two lead assemblies with single drop, with the lower assembly including in line fuses.
Figure 28:
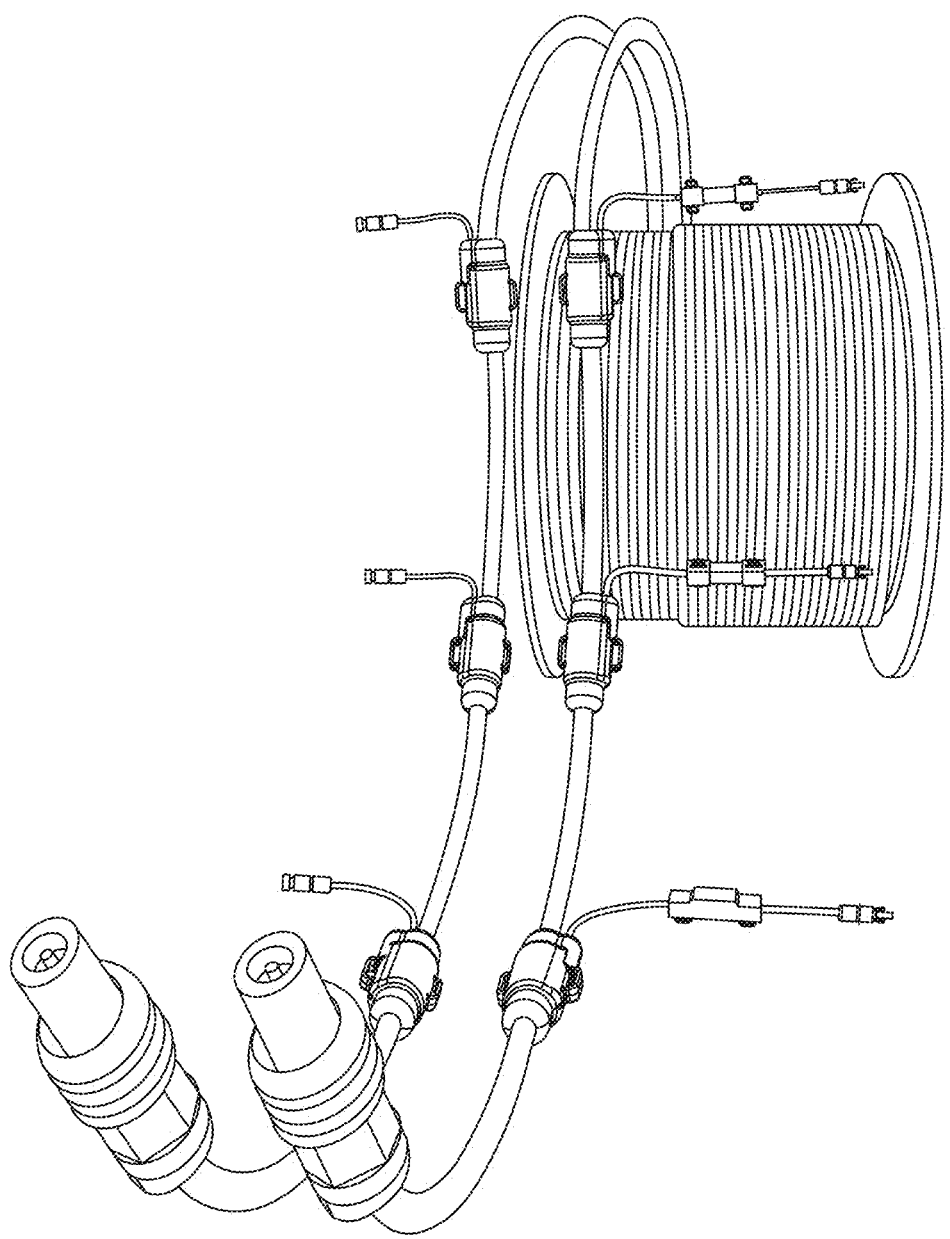
FIG. 28 depicts a spooled lead assembly with single drop.

Each feeder cable 14 terminates in feeder cable connector 15, which connects to trunk buss jumper 27 (FIG. 27), to inverter 38 (FIG. 3), or to connection unit, recombiner, or disconnect unit (not shown). Trunk buss jumper 27 is essentially an "extension cord" which is economical to use in some configurations, for example where portions of feeder cable 14 are installed at different times. In another situation, trunk buss jumper 27 could be buried underground and feeder cable 14 above ground. Being able in install these components independent of one another can offer much more diversity. Trunk buss jumper 27 could also be utilized if there are a significant number of varying lengths from solar array 32 to inverter 38. Trunk buss jumper 27 could also be utilized if there is a substantial distance (greater than >50 meters) to travel from closest solar array 32 to inverter 38 and it would be wasteful to use a lead assembly with unused drop lines. The other end of feeder cable 14 terminates in joint 17 having end piece 26, which is typically installed at the solar array located furthest from the inverter. In alternative embodiments, feeder cable 14 includes feeder cable connector 15 at both terminal ends so feeder cables 14 can be connected one-to-another in an end-to-end orientation. In yet another embodiment, one or both ends of feeder cables 14 are blunt cut for subsequent manual connection, for example stripping and crimping to connectors or other segments of feeder cable.

Feeder cable 14 is preferably constructed of 6 gauge to 1000 MCM wire, with the specific wire chosen based on factors such as the number of associated drop lines and the distance between the connection and downstream inverter and whether or not feeder cable 14 is of aluminum or copper construction. Feeder cable connectors 15 are preferably off-the-shelf connectors such as KBT10BV & KST10BV from Multi-Contact of Windsor, CA.

Figure 37:
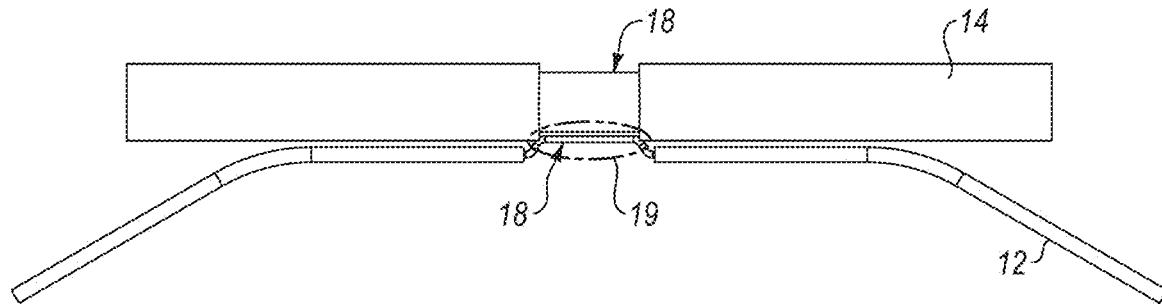
FIG. 37 depicts a dual drop lead assembly for 750MCM cable with wires exposed at nexus.
Figure 38:
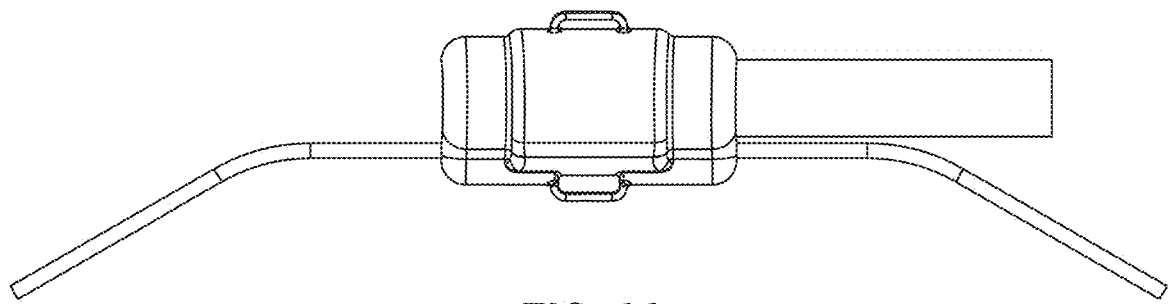
FIG. 38 depicts the end piece for a dual drop lead assembly for 750MCM cable.
Figure 39:
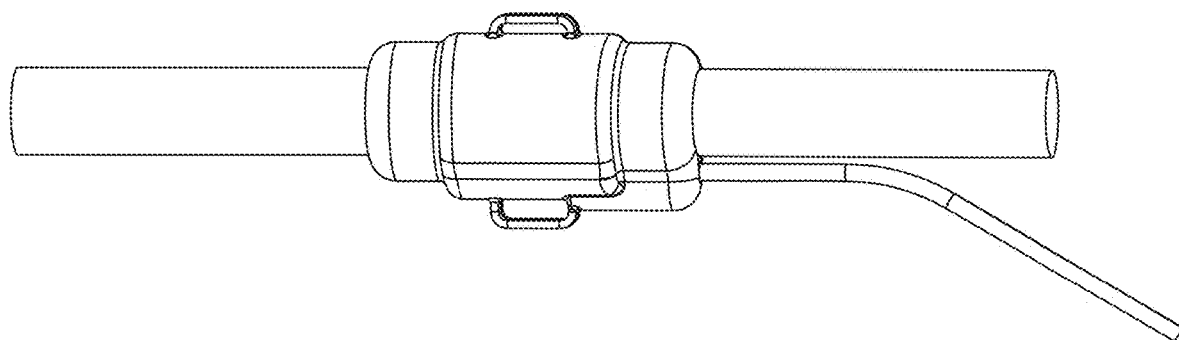
FIG. 39 depicts a single drop lead assembly for 750MCM cable with overmold shown.
Figure 40:
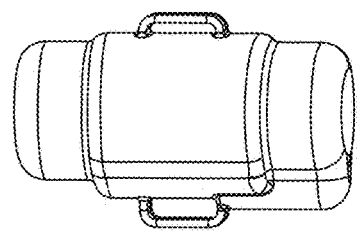
FIG. 40 depicts the overmold for a dual single lead assembly for 750MCM cable.
Figure 41:
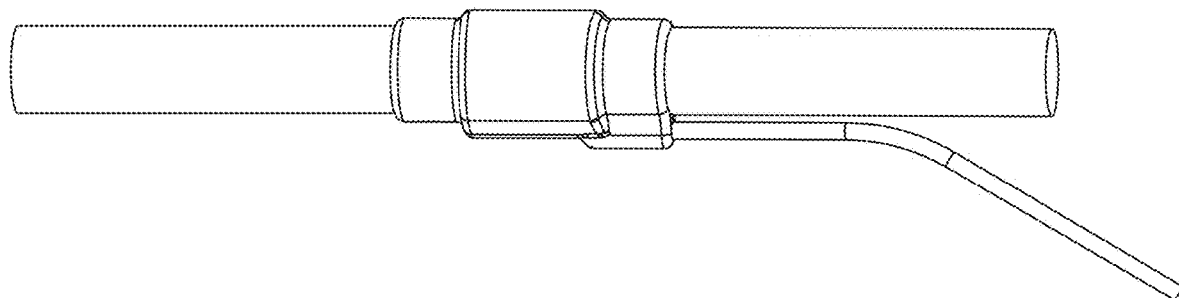
FIG. 41 depicts a single drop lead assembly for 750MCM cable with undermold shown.
Figure 42:
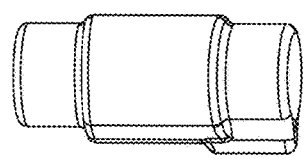
FIG. 42 depicts the undermold for a single drop lead assembly for 750MCM cable.
Figure 43:
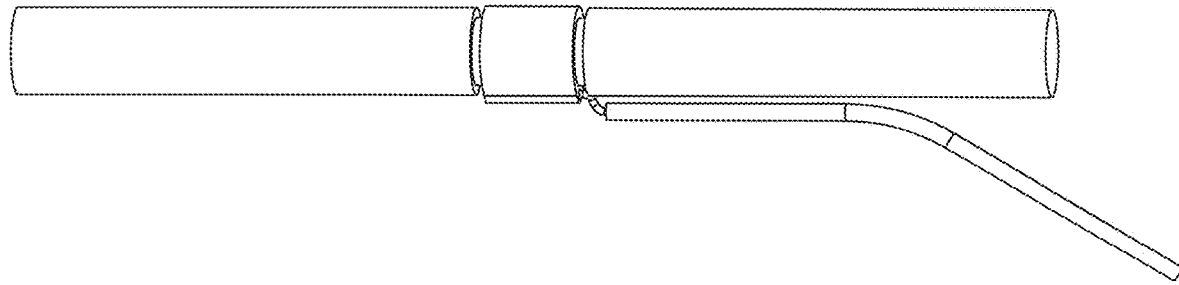
FIG. 43 depicts a single drop lead assembly for 750MCM cable with compression lug shown.
Figure 44:
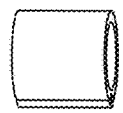
FIG. 44 depicts the compression lug for a single drop lead assembly for 750MCM cable.
Figure 45:
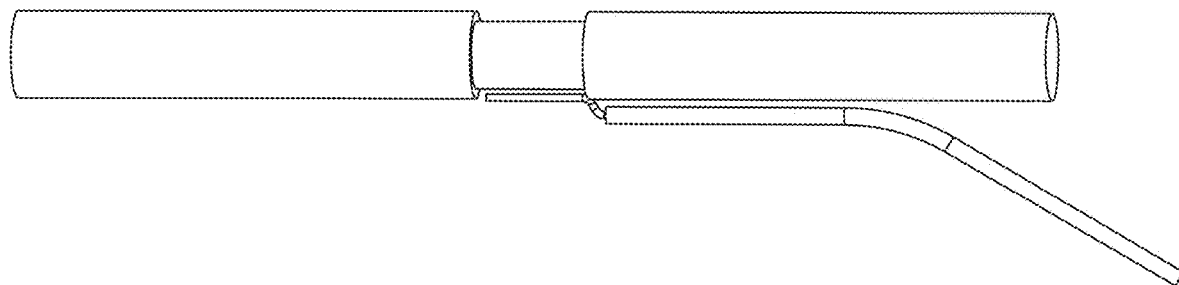
FIG. 45 depicts a single drop lead assembly for 750MCM cable with wires exposed at nexus.
Figure 46:
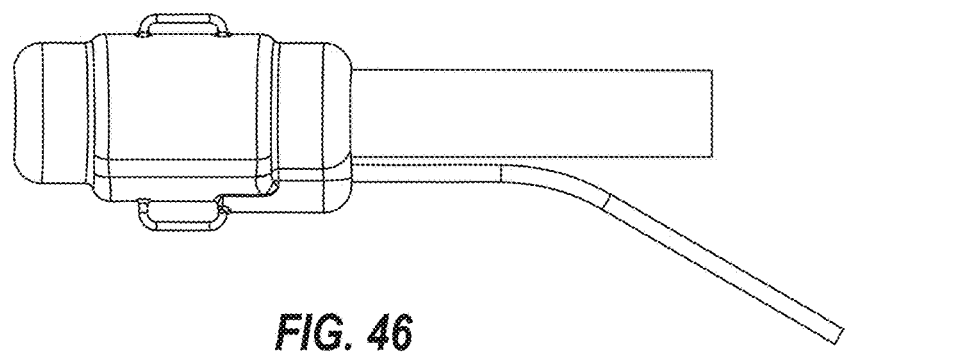
FIG. 46 depicts the end piece for a single drop lead assembly for 750MCM cable.
Figure 47:
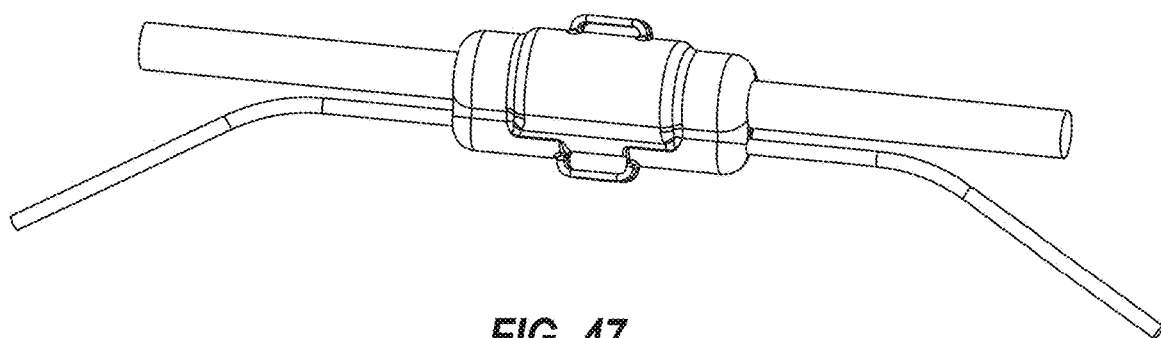
FIG. 47 depicts a dual drop lead assembly for 250MCM cable.
Figure 48:
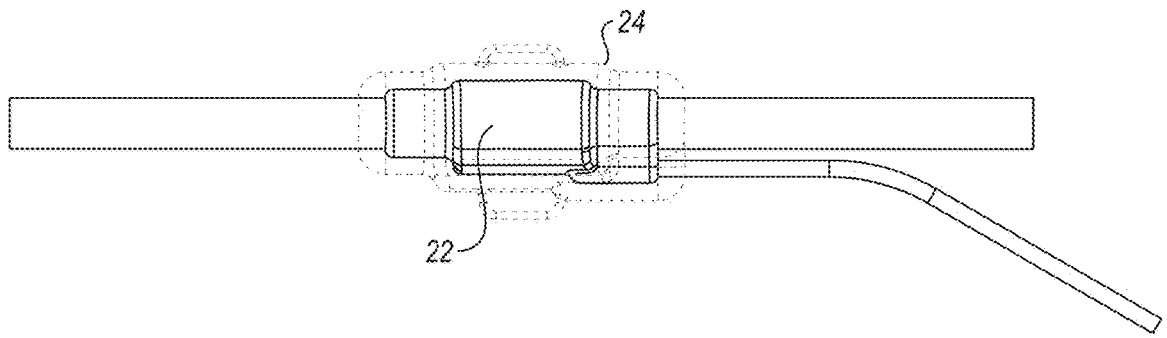
FIG. 48 depicts a single drop lead assembly for 250MCM cable with the overmold depicted in phantom.
Figure 49:
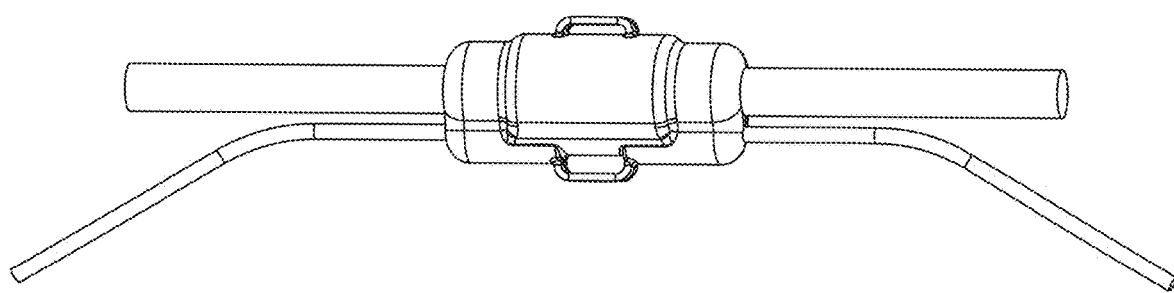
FIG. 49 depicts a dual drop lead assembly for 250MCM cable with overmold shown.
Figure 50:
FIG. 50 depicts the overmold for a dual drop lead assembly for 250MCM cable.
Figure 51:
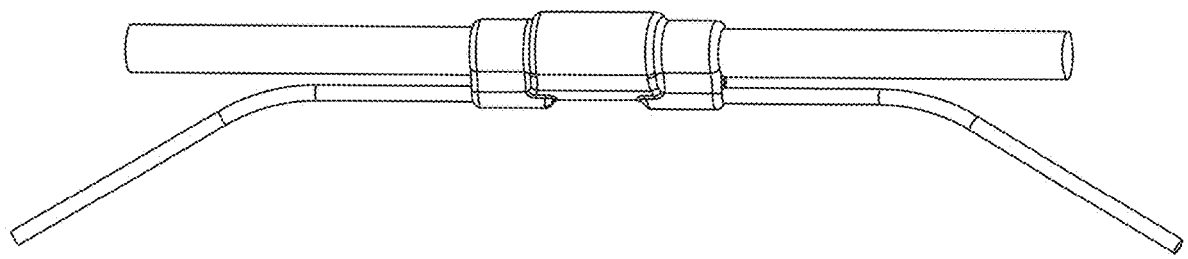
FIG. 51 depicts a dual drop lead assembly for 250MCM cable with undermold shown.
Figure 52:
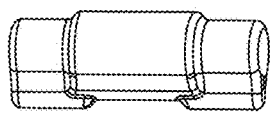
FIG. 52 depicts the undermold for a dual drop lead assembly for 250MCM cable.
Figure 53:
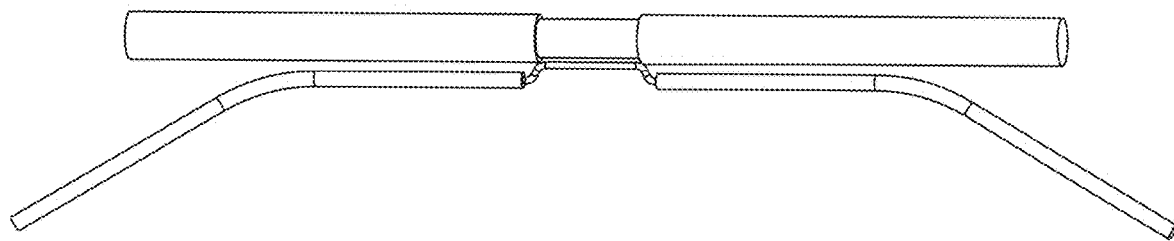
FIG. 53 depicts a dual drop lead assembly for 250MCM cable with wires exposed at nexus.
Figure 54:
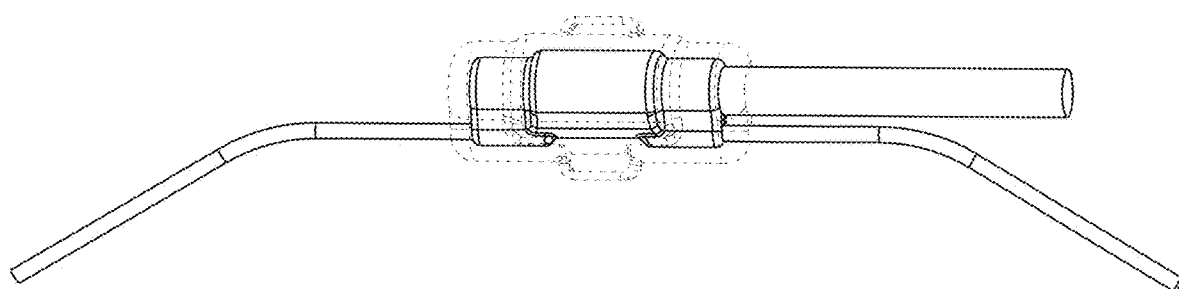
FIG. 54 depicts the end of string for a dual drop lead assembly for 250MCM cable with the overmold depicted in phantom.
Figure 55:
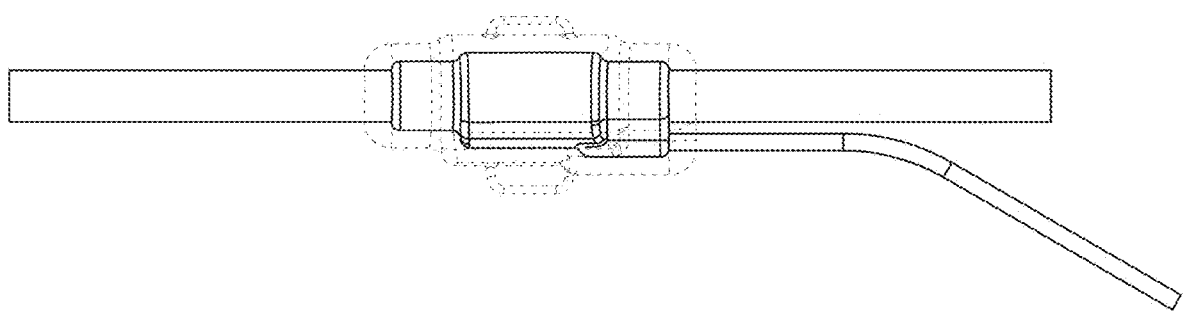
FIG. 55 depicts a single drop lead assembly for 250MCM cable with the overmold depicted in phantom.
Figure 56:
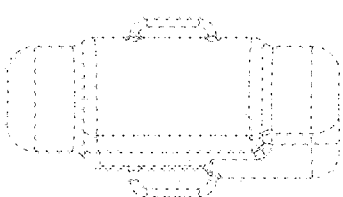
FIG. 56 depicts the overmold for a single drop lead assembly for 250MCM cable.
Figure 57:
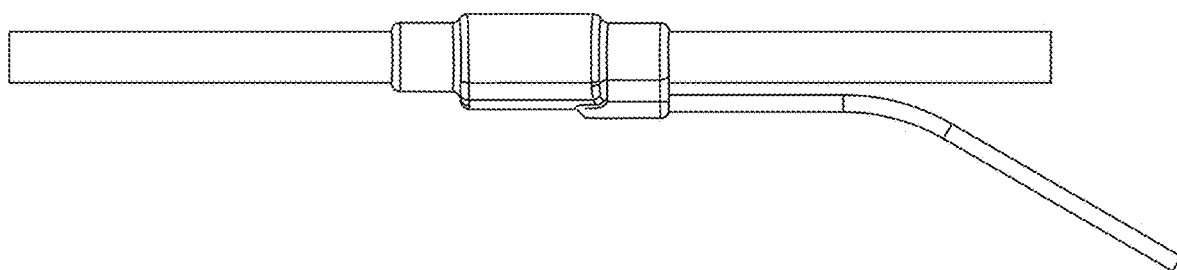
FIG. 57 depicts a single drop lead assembly for 250MCM cable with undermold shown.
Figure 58:
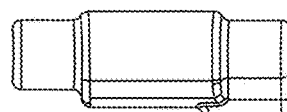
FIG. 58 depicts the undermold for a single drop lead assembly for 250MCM cable.
Figure 59:
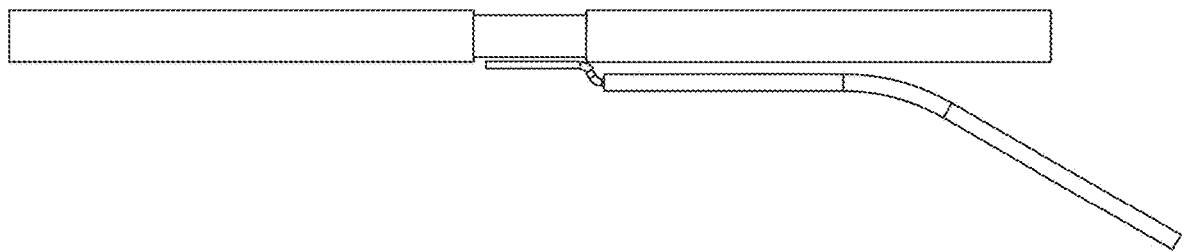
FIG. 59 depicts a single drop lead assembly for 250MCM cable with wires exposed at nexus.
Figure 60:
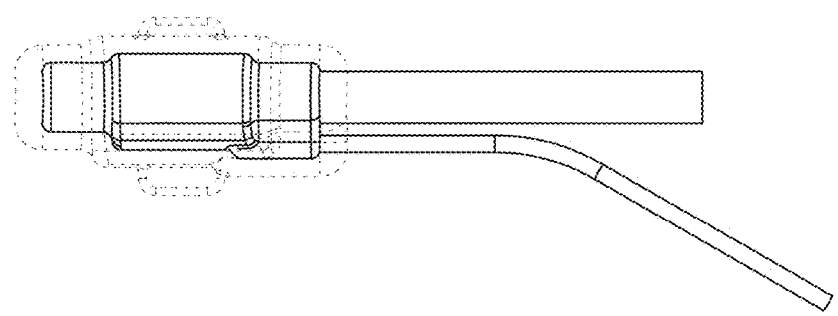
FIG. 60 depicts the end of string for a single drop lead assembly for 250MCM cable with the overmold depicted in phantom.
Figure 61:
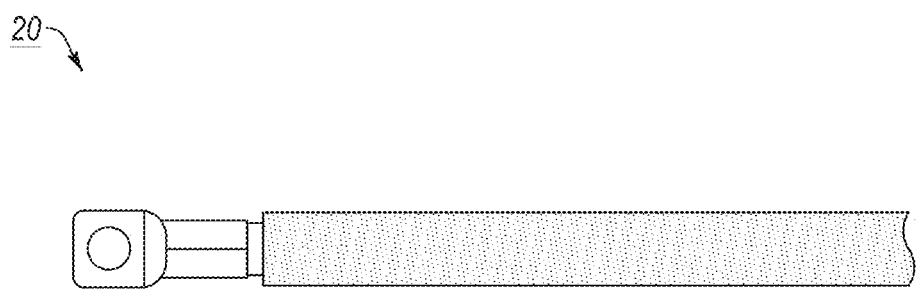
FIG. 61 depicts a compression lug.

Referring to FIG. 37, drop line 12 and feeder cable 14 electrically couple at nexus 19 of joint 17. This is preferably accomplished by stripping wire insulation 16 from corresponding segments of drop line 12 and feeder cable 14, adjoining respective segments of exposed wire 18, and securing contact between the segments of exposed wire by employing compression lug 20. It should be understood that securing contact between the segments could be achieved by other means including soldering, splicing, crimping, and so forth. Compression lug 20 is preferably surrounded by undermold 22, which is preferably composed of RTP 2099Ex127663 from RTP Co. of Winona, MN that has been applied by injection molding. As shown in FIG. 48, undermold 22 is preferably surrounded by overmold 24, which is preferably composed of RTP 199×124807 from RTP Co of Winona, MN that has been applied by injection molding. The resulting assembly is profoundly durable, resistant to environmental factors such as temperature fluctuations, debris, and moisture, and is strong enough to be buried.

In an alternative embodiment, there is no undermold, just an overmold, which is applied in a single molding process.

It is a very important feature that a system of the present invention doesn't require a combiner box. Rather, lead assemblies 10 effectively "combine" the power from solar arrays 32 and deliver it to inverter 38. As shown in FIG. 3, the present invention also eliminates the need of DC feeders, which would carry power from the combiner box to the inverter in a conventional system. Also, the need for fuses can be eliminated by using drop lines including in line fuses 29, as shown in the lower assembly of FIG. 27. Appropriate fuses include of HP10x from Mersen of Newburyport, MA.

An embodiment of the present invention preferably has the following specifications: Voltage rating of 600 VDC/ 1000 VDC/1500 VDC; Maximum branch current of 30 amps per string; Maximum overcurrent protection of 30 amps per string; maximum trunk cable size of 750MCM; and Maximum ambient operating temperature of 50° C., although other embodiments beyond these specifications are within the scope of the inventions.

It should also be understood that the illustrations are for the purpose of describing a preferred embodiment of the inventions and are not intended to limit the inventions thereto. By way of example, the present invention can be scaled up or down to accommodate any feeder cable size, including the common 250 and 750MCM cable sizes. Also, while the current invention has been described in association with DC applications, it should be understood that it could also be implemented into feeders deployed in AC systems, which would negate the need for AC recombiner boxes. It should also be understood that approximations allow variances of +/−10%, unless otherwise noted or nonsensical such as a length less than zero. It should also be understood that all ranges set forth inherently include the endpoints themselves, as well as all increments, there between.

What is claimed is:

1. A lead assembly for use in a solar energy installation, the lead assembly comprising:
a first feeder cable having a first diameter and a first polarity;
a second feeder cable having a second diameter and a second polarity; and
a plurality of drop lines;
wherein:
each of the first feeder cable and the second feeder cable contains two or more joints;
each joint electrically couples one or more drop lines of the plurality of drop lines to the first or second feeder cable at a nexus;
each drop line has a diameter that is less than the first diameter and less than the second diameter;
each drop line coupled to the first feeder cable is configured to be electrically connected to a wire harness configured to electrically connect to an array of solar panels;
two or more of the plurality of drop lines that are connected to the first feeder cable each includes an in line fuse disposed between the joint and the wire harness; and
each joint has a mold enclosure configured to enclose at least a portion of the nexus;
wherein a first mold enclosure that encloses at least a portion of a first nexus of the first feeder cable includes:
a feeder cable passage that extends completely through the first mold enclosure, the first feeder cable extending through the feeder cable passage along a first longitudinal axis;
a first drop line passage that extends at least partially through the first mold enclosure, a first drop line of the plurality of drop lines extending through the first drop line passage along a second longitudinal axis; and
a second drop line passage that extends at least partially through the first mold enclosure, a second drop line of the plurality of drop lines extending through the second drop line passage along a third longitudinal axis;
the first and second drop lines are part of a single drop line cable and the first and second drop line passages form a drop line cable passage that extends completely through the first mold enclosure.

2. The lead assembly of claim 1, wherein the first feeder cable is configured for electrical connection to an inverter without a combiner box between the first feeder cable and the inverter.

3. The lead assembly of claim 1, wherein each mold enclosure completely encloses the corresponding nexus.

4. The lead assembly of claim 1, wherein each drop line coupled to the first feeder cable is configured to be electrically connected to a central trunk of the wire harness, the central trunk having a plurality of branches that are configured to electrically connect to a separate solar panel contained in the array of solar panels.

5. The lead assembly of claim 1, wherein each mold enclosure comprises:
an overmold that encloses the corresponding nexus; or
an undermold that encloses the corresponding nexus and an overmold that encloses the undermold.

6. The lead assembly of claim 1, wherein at least one of the second longitudinal axis or the third longitudinal axis is not parallel to the first longitudinal axis.

7. A solar power system, comprising:
a lead assembly, the lead assembly comprising:
a first feeder cable having a first diameter and a first polarity;
a second feeder cable having a second diameter and a second polarity; and
a plurality of drop lines;
wherein:
each of the first feeder cable and the second feeder cable contains two or more joints;
each joint electrically couples one or more drop lines of the plurality of drop lines to the first or second feeder cable at a nexus;
each drop line has a diameter that is less than the first diameter and less than the second diameter;
two or more of the plurality of drop lines that are connected to the first feeder cable each includes an in line fuse disposed between the joint and a wire harness from a plurality of wire harnesses; and
each joint has a mold enclosure configured to enclose at least a portion of the nexus;
a first wire harness of the plurality of wire harnesses comprising a first central trunk and a first plurality of branches;
a first plurality of solar panels electrically coupled by the first wire harness to form a first solar array, each branch of the first plurality of branches electrically coupling a different one of the first plurality of solar panels to the first central trunk;
a second wire harness of the plurality of wire harnesses comprising a second central trunk and a second plurality of branches;
a second plurality of solar panels electrically coupled by the second wire harness to form a second solar array, each branch of the second plurality of branches electrically coupling a different one of the second plurality of solar panels to the second central trunk;
wherein:
a first drop line of the plurality of drop lines terminates at a first drop line connector;

the first drop line connector connects to the first central trunk;

the first drop line connector and the first drop line electrically couple the first solar array to the first or second feeder cable;

a second drop line of the plurality of drop lines terminates at a second drop line connector;

the second drop line connector connects to the second central trunk; and the second drop line connector and the second drop line electrically couple the second solar array to the first or second feeder cable;

wherein a first mold enclosure that encloses at least a portion of a first nexus of the first feeder cable includes:

a feeder cable passage that extends completely through the first mold enclosure, the first feeder cable extending through the feeder cable passage along a first longitudinal axis;

a first drop line passage that extends at least partially through the first mold enclosure, a first drop line of the plurality of drop lines extending through the first drop line passage along a second longitudinal axis; and a second drop line passage that extends at least partially through the first mold enclosure, a second drop line of the plurality of drop lines extending through the second drop line passage along a third longitudinal axis; and wherein the first and second drop lines are part of a single drop line cable and the first and second drop line passages form a drop line cable passage that extends completely through the first mold enclosure.

8. The solar power system of claim 7, wherein the first feeder cable is configured for electrical connection to an inverter without a combiner box between the first feeder cable and the inverter.

9. The solar power system of claim 7, wherein each mold enclosure completely encloses the corresponding nexus.

10. The solar power system of claim 7, wherein each mold enclosure comprises:

an overmold that encloses the corresponding nexus; or an undermold that encloses the corresponding nexus and an overmold that encloses the undermold.

11. The solar power system of claim 7, wherein at least one of the second longitudinal axis or the third longitudinal axis is not parallel to the first longitudinal axis.

12. A lead assembly for use in a solar energy installation, the lead assembly comprising:

a first drop line that has a first diameter and that terminates at a drop line connector, the drop line connector configured to connect with a wire harness, the wire harness configured to electrically connect to an array of solar panels;

a second drop line that has a second diameter;

a feeder cable electrically coupled to the first and second drop lines at a nexus, wherein the feeder cable has a third diameter that is greater than the first diameter and greater than the second diameter;

an inline fuse disposed in the first drop line between the nexus and the drop line connector; and a mold structure that at least partially surrounds the nexus, the mold structure defining:

first and second openings from which the feeder cable extends from the mold structure in opposite directions, a feeder cable passage extending completely through the mold structure between the first and second openings, the feeder cable extending through the feeder cable passage;

a third opening from which the first drop line extends from the mold structure; and a fourth opening from which the second drop line extends from the mold structure;

wherein a drop line cable passage extends completely through the mold structure between the third and fourth openings and the first and second drop lines are each part of a single drop line cable that extends completely through the drop line cable passage.

13. The lead assembly of claim 12, wherein the third and fourth openings defined by the mold structure are on opposite sides of the mold structure and the first and second drop lines extend from the third and fourth openings of the mold structure in opposite directions.

14. The lead assembly of claim 12, wherein the feeder cable is configured for electrical connection to an inverter without a combiner box between the feeder cable and the inverter.

15. The lead assembly of claim 12, wherein each mold enclosure completely encloses the corresponding nexus.

16. The lead assembly of claim 12, wherein the first drop line is configured to be electrically connected to a central trunk of the wire harness, the central trunk having a plurality of branches that are configured to electrically connect to a separate solar panel contained in the array of solar panels.

17. The lead assembly of claim 12, wherein each mold structure comprises:

an overmold that encloses the nexus; or an undermold that encloses the nexus and an overmold that encloses the undermold.

18. The lead assembly of claim 12, wherein at least one of the second longitudinal axis or the third longitudinal axis is not parallel to the first longitudinal axis.

* * * * *